United States Patent
Li et al.

(10) Patent No.: US 11,465,652 B2
(45) Date of Patent: Oct. 11, 2022

(54) SYSTEMS AND METHODS FOR DISENGAGEMENT PREDICTION AND TRIAGE ASSISTANT

(71) Applicant: Woven Planet North America, Inc., Los Altos, CA (US)

(72) Inventors: Xiaojie Li, Sunnyvale, CA (US); Sen Xu, Mountain View, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 57 days.

(21) Appl. No.: 16/899,252

(22) Filed: Jun. 11, 2020

(65) Prior Publication Data
US 2021/0387650 A1 Dec. 16, 2021

(51) Int. Cl.
*B60W 60/00* (2020.01)
*G01C 21/34* (2006.01)
*B60W 50/14* (2020.01)

(52) U.S. Cl.
CPC ........ *B60W 60/0059* (2020.02); *B60W 50/14* (2013.01); *B60W 60/0018* (2020.02);
(Continued)

(58) Field of Classification Search
CPC ........... B60W 60/0025; B60W 50/085; B60W 50/14; B60W 60/0053; B60W 2520/105;
(Continued)

(56) References Cited

U.S. PATENT DOCUMENTS 8,996,224 B1 * 3/2015 Herbach ............. G05D 1/0044
701/23
10,611,384 B1 * 4/2020 VandenBerg, III ... B60W 50/14
(Continued)

FOREIGN PATENT DOCUMENTS

| JP | 2019109700 | 7/2019 |
| KR | 20180092781 A | 8/2018 |
| WO | 2019088977 A1 | 5/2019 |

OTHER PUBLICATIONS

"Levitated Mass: The Story of Michael Heizer's Monolithic Sculpture" Documentary 88 minutes, Filmmaker—Doug Pray, Electric City Entertainment, Jun. 2013 (Year: 2013).*
(Continued)

*Primary Examiner* — Dale W Hilgendorf
(74) *Attorney, Agent, or Firm* — Christopher G. Darrow; Darrow Mustafa PC

(57) ABSTRACT

In one embodiment, a computing system of a vehicle may receive perception data associated with a scenario encountered by a vehicle while operating in an autonomous driving mode. The system may identify the scenario based at least on the perception data. The system may generate a performance metric associated with a vehicle navigation plan to navigate the vehicle in accordance with the identified scenario. In response to a determination that the performance metric associated with the vehicle navigation plan fails to satisfy one or more criteria for navigating the vehicle in accordance with the identified scenario, the system may trigger a disengagement operation related to disengaging the vehicle from the autonomous driving mode. The system may generate a disengagement record associated with the triggered disengagement operation. The disengagement record may include information associated with the identified scenario encountered by the vehicle related to the disengagement operation.

20 Claims, 13 Drawing Sheets

(52) U.S. Cl.
CPC ..... *B60W 60/0053* (2020.02); *G01C 21/3453* (2013.01); *B60W 2520/105* (2013.01); *B60W 2554/80* (2020.02)

(58) Field of Classification Search
CPC ....... B60W 2554/80; B60W 30/18009; B60W 60/0018; G01C 21/3453
See application file for complete search history.

(56) References Cited

U.S. PATENT DOCUMENTS

| | | | |
|---|---|---|---|
| 2018/0181121 A1 | 6/2018 | Min | |
| 2018/0247160 A1 | 8/2018 | Rohani et al. | |
| 2018/0329414 A1* | 11/2018 | Igarashi | B60W 40/08 |
| 2018/0342033 A1* | 11/2018 | Kislovskiy | G01C 21/3697 |
| 2019/0011924 A1 | 1/2019 | Xiao | |
| 2019/0113916 A1* | 4/2019 | Guo | G05D 1/0088 |
| 2019/0135283 A1* | 5/2019 | Bonk | G05D 1/0231 |
| 2019/0137287 A1* | 5/2019 | Pazhayampallil | G01C 21/32 |
| 2019/0163176 A1* | 5/2019 | Wang | G05D 1/0038 |
| 2019/0235499 A1* | 8/2019 | Kazemi | B62D 15/025 |
| 2019/0243364 A1* | 8/2019 | Cohen | G05D 1/0221 |
| 2019/0243372 A1* | 8/2019 | Huval | B60W 30/0953 |
| 2019/0278271 A1* | 9/2019 | Blumer | G07C 5/085 |
| 2019/0311559 A1* | 10/2019 | Bigio | G01C 21/3697 |
| 2019/0389482 A1* | 12/2019 | Michalakis | B60W 60/001 |
| 2020/0111169 A1* | 4/2020 | Halder | G01C 21/3697 |
| 2021/0046946 A1* | 2/2021 | Nemec | B60W 60/0053 |
| 2021/0142160 A1* | 5/2021 | Mohseni | G06N 3/0454 |
| 2021/0309248 A1* | 10/2021 | Choe | G06N 3/04 |
| 2021/0312248 A1* | 10/2021 | Tchuiev | G06K 9/6277 |
| 2022/0057806 A1* | 2/2022 | Guo | G06N 3/04 |

OTHER PUBLICATIONS

International Searching Authority, International Search Report and Written Opinion, PCT/US2021/028951, dated Aug. 2, 2021.

* cited by examiner

SYSTEMS AND METHODS FOR DISENGAGEMENT PREDICTION AND TRIAGE ASSISTANT

BACKGROUND

Autonomous vehicles or manually-driven vehicles with driver-assist features may navigate through their surrounding environment based on the perception data of the associated environment. A vehicle typically perceives its environment using sensors such as cameras, radars, and LiDARs. A computing system (e.g., an on-board computer and/or a remote server computer) may then process and analyze the sensor data to make operational decisions in response to situations detected in the surrounding environment.

Existing autonomous vehicles may rely on human operators to disengage from autonomous driving. For example, a safety driver may disengage the vehicle from an autonomous driving mode and take over the control of the vehicle when the safety driver has safety concerns. However, this process of disengaging the autonomous vehicle may be subjective according to the safety driver.

DESCRIPTION OF EXAMPLE EMBODIMENTS

Figure 1A:
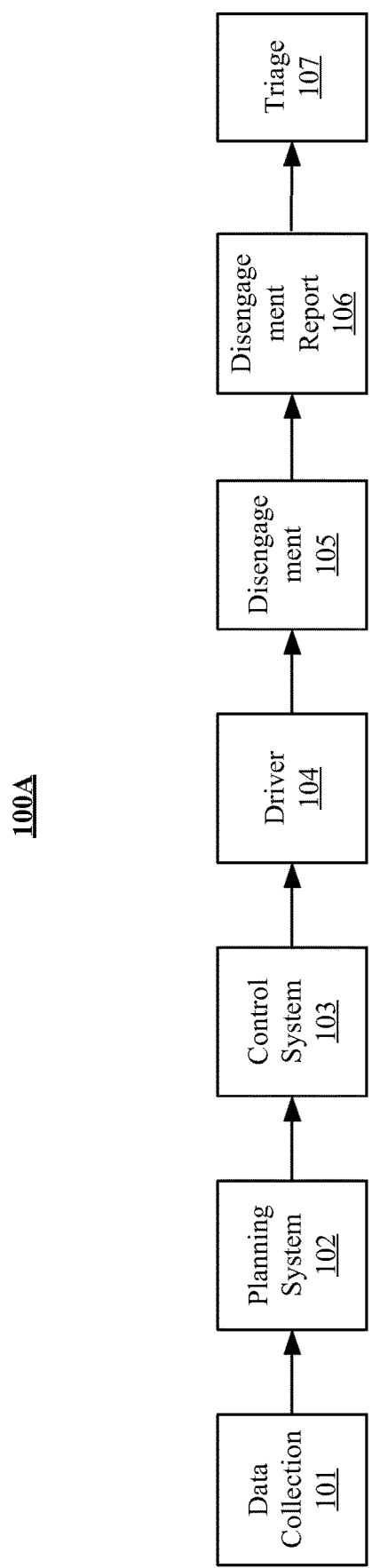
FIG. 1A illustrates an example process used by existing autonomous vehicles (AVs) for disengaging from autonomous driving and triaging disengagement records.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Existing autonomous vehicles (AVs) rely on human drivers, instead of vehicle planning systems, to determine whether and when to disengage the vehicle from autonomous driving because the vehicle planning systems are not trained to automatically handle these disengagement scenarios. After the human driver disengages the vehicle, there is currently no effective way to precisely define the scenario encountered by the vehicle that triggered this disengagement. The subjective description from the human driver may be unreliable and inconsistent. Although AVs are currently evaluated based on the more quantifiable "miles-per-intervention (MPI)" metric, the MPI metric provides no granular level insight on specific scenarios about why disengagements were triggered and when disengagements should be triggered. Furthermore, the MPI metric cannot be used to provide feedback to the autonomy stack of AVs to improve scenario detection/classification or automatic planning because of a lack of accurate vehicle performance information under the associated scenarios. In addition, the current triage process relies on human experts to go through each disengagement report to categorize disengagement instance and it is slow and inefficient.

To solve these problems, particular embodiments of the system may automatically predict whether observed scenarios warrant a vehicle to disengage from an autonomous or semi-autonomous driving mode and, accordingly, trigger at least one or more automated executions, including: (1) alerting the operator to take control the vehicle, (2) slowing down and disengaging the vehicle automatically, or (3) generating disengagement records and triage records. The system may use a machine learning (ML) model to classify and identify scenarios based on vehicle perception data. The system may run a performance evaluation for the current scenario when that scenario is known and can be handled by the vehicle. The vehicle performance for this scenario may be evaluated based on a planned vehicle trajectory and one or more evaluation rules. When the performance is lower than a pre-determined threshold, the system may use a disengagement prediction module to trigger the automatic vehicle disengagement operation (which may slow down the vehicle, alert the driver to take over, and disengage the vehicle). Then, the system may generate a pre-filled disengagement record based on the current scenario and generate a triage record based on the disengagement record and the current performance metrics of the vehicle. When the current scenario is identifiable but cannot be handled by the vehicle, the system may directly use the disengagement prediction module to trigger the automatic disengagement and generate the pre-filled disengagement record. When the current scenario is unidentifiable by the system, the system may allow the safety driver to decide whether to trigger the disengagement. The pre-filled disengagement records may be edited by the driver. The scenario-specific data in disengagement records and triage records may be used to train the system to improve its ability for identifying and classifying future scenarios.

By automatically identifying and classifying scenarios encountered by AVs, the system may allow AVs to automatically trigger disengagements and generate disengagement records and triage records based on specific scenarios and vehicle performance metrics. By automatically generating disengagement records and triage records, particular embodiments of the system may provide granular scenario-specific data with insights for why disengagements were triggered and when disengagements should be triggered. By capturing this granular scenario-specific data, particular embodiments of the systems may provide insights on how the AVs respond to particular scenarios through the disengagement data and the human operators' feedback to disengagement data (e.g., whether the human operator changed or adjusted the pre-filled scenario classification, the positive and negative samples from our pre-filled records). Particular embodiments of the system may use the scenario-specific data to train the system to more accurately classify the scenarios as perceived by the AVs and allow the AVs to learn the capability to automatically determine when to disengage from autonomous driving. Particular embodiments of the system may use scenario-specific data to train the system on how to generate better navigation plans for navigating the vehicle under these scenarios and eventually to learn to autonomously navigate vehicle under these scenarios. By handling different scenarios encountered by the vehicle within the framework, particular embodiments of the system may provide uniform benchmarks for whether and when to disengage the vehicle from autonomous driving.

FIG. 1A illustrates an example process 100A used by existing autonomous vehicles (AVs) for disengaging from autonomous driving and triaging disengagement records. Existing AVs may rely on human drivers to determine whether and when to disengage the vehicle from an autonomous driving mode. For example, an AV may use a data collection module 101 to capture the perception data related to the vehicle's surrounding environment and feed the perception data to a planning system 102 of the vehicle. The planning system 102 may generate navigation plans based on the perception data and navigate the vehicle by controlling the vehicle through a control system 103. The planning system 103 may not be trained to automatically handle disengagement scenarios (e.g., to disengage from autonomous driving automatically). Instead, the human operator 104 (e.g., a safety driver) may observe surrounding environment and vehicle performance to determine whether to disengage the vehicle from autonomous driving and to take over the control the vehicle. After the human driver disengages the vehicle (e.g., through a disengagement system 105), there is currently no effective way to precisely define the scenario encountered by the vehicle that leads to this disengagement. The human driver may generate a disengagement report 106 each time the human driver disengages the vehicle from antonymous driving. However, the subjective description from the human driver may be unreliable and inconsistent and cannot be effectively used to improve the vehicle capability to handle similar scenarios in future. Furthermore, AVs may be currently evaluated based on "miles-per-intervention (MPI)" metric which provides no granular level insight on specific scenarios about why disengagements were triggered and when disengagements should be triggered. The MPI metric cannot be used to provide feedback to the autonomy stack of AVs to improve scenario detection/classification or automatic planning because lack of accurate vehicle performance information related to these scenarios. In addition, the current triage process 107 may rely on human experts to go through each disengagement report to categorize disengagement instances and the process could be slow and inefficient.

Figure 1B:
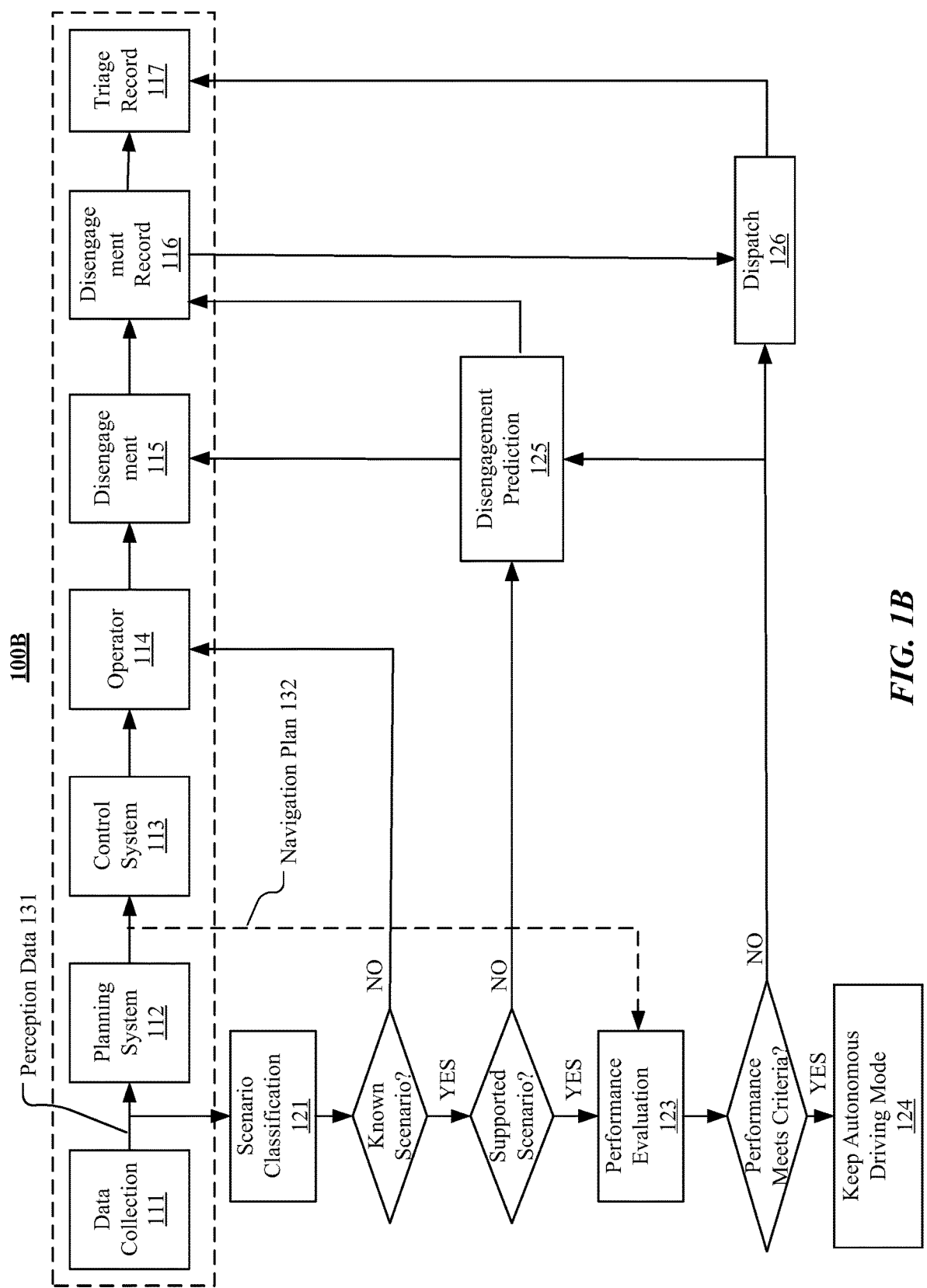
FIG. 1B illustrates an example framework for automatically disengaging vehicles from autonomous driving and automatically triaging disengagement records.

FIG. 1B illustrates an example framework 100B for automatically disengaging vehicles from autonomous driving and automatically triaging disengagement records. In particular embodiments, autonomous vehicles may use the framework 100B to automatically predict whether the current scenario encountered by the vehicle warrant the vehicle to disengage from an autonomous or semi-autonomous driving mode and, accordingly, trigger one or more automated executions (e.g., alerting the driver to take control the vehicle, slowing down and disengaging the vehicle automatically, and generating disengagement records and triage records). In particular embodiments, the system may use a data collection module 111 to capture perception data 131 of the surrounding environment. The perception data 131 may be associated with particular scenarios encountered by the vehicle when navigating in an autonomous driving mode. The system may feed the perception data 131 to a planning system 112, which may generate a navigation plan 132 based on the perception data to navigate the vehicle under the current scenario. The system may control the vehicle through a control system 113 and navigate the vehicle based on the navigation plan 132 generated by the planning system 112. Instead of fully relying on the operator 114 (e.g., a safety driver or a teleoperator) to determine whether and when to disengage the vehicle from autonomous driving, the system may feed the perception data 131 to a scenario classification module 121, which classifies the current scenario encountered by the vehicle based on the perception data 131. In response to a determination that the current scenario encountered by the vehicle is a known scenario that is supported by the planning system 112 of the vehicle, the system may use a performance evaluation module 123 to evaluate the vehicle performance based on the current navigation plan 132 generated by the planning system 112 to navigate the vehicle according to the current scenario. The vehicle performance under the current navigation plan 132 may be evaluated based on a planned vehicle trajectory and one or more evaluation rules. For example, the system may calculate a vehicle performance score (e.g., within a normalized range of [0, 1]) based on the current navigation plan 132 and compare the performance score to a pre-determined threshold.

In particular embodiments, when the performance score is lower than the pre-determined threshold (which indicates a bad vehicle performance), the system may trigger an automatic vehicle disengagement operation through a disengagement prediction module 125, while the vehicle keeps autonomous driving mode 124 otherwise. The automatic vehicle disengagement operation may slow down the speed of the vehicle, alert the driver to take over the vehicle control, and automatically disengage the vehicle from autonomous driving through a disengagement module 115. Then, the system may automatically generate a disengagement record 116 based on a pre-filled disengagement record according to the current scenario of the vehicle. The automatically generated disengagement record 116 may be edited by the operator 114. The system may automatically dispatch (e.g., through a dispatch module 126) the newly generated disengagement record 116 and generate a triage record 117 based on the disengagement record and the evaluated performance metrics of the vehicle. The scenario-specific data in the disengagement record 116 and triage record 117 may be used to train the system to improve its ability for identifying and classifying future scenarios.

In response to a determination the current scenario is a known scenario that is not supported by the planning system 112, the system may directly use the disengagement prediction module 125 to trigger the automatic disengagement operation 115 and generate the disengagement record 116 based on the pre-filled template. In response to a determination that the current scenario is unidentifiable by the system, the system may allow the operator 114 (e.g., a safety driver or a teleoperator) to decide whether and when to disengage the vehicle from autonomous driving. It is notable that the autonomous vehicles described in this disclosure are for example purpose only and the methods, processes, and principles described in this disclosure are not limited to autonomous vehicles. For example, the methods, processes, and principles described in this disclosure may be applicable to autonomous vehicles, vehicles driven by human drivers or remote operators, vehicles with driver-assist systems, human-machine hybrid-driven vehicles, or any suitable vehicles.

In particular embodiments, the data collection module 111 of the vehicle may include a number of sensors or sensing systems including, for example, but not limited to, optical cameras, thermal cameras, LiDARs, radars, speed sensors, steering angle sensors, braking pressure sensors, a GPS, inertial measurement units (IMUs), acceleration sensors, etc. The vehicle system may include one or more computing systems (e.g., a data collection device, a mobile phone, a tablet, a mobile computer, an on-board computer, a high-performance computer) to control and coordinate the sensors and cameras to capture the perception data 131 related to the scenarios encountered by the vehicle in the surrounding environment. In particular embodiments, the vehicle system may collect data related to the vehicle itself including, for example, but not limited to, vehicle speeds, moving directions, wheel directions, steering angles, steering force on the steering wheel, pressure of braking pedal, pressure of acceleration pedal, acceleration (e.g., based on IMU outputs), rotation rates (e.g., based on IMU/gyroscope outputs), vehicle moving paths, vehicle trajectories, locations (e.g., GPS coordinates), signal status (e.g., ON-OFF states of turning signals, braking signals, emergence signals), etc.

In particular embodiments, the vehicle system may use one or more sensors or sensing systems to collect data related to other nearby vehicles in the surrounding environment. The vehicle system may collect the vehicle data and driving behavior data related to other vehicles including, for example, but not limited to, vehicle images, vehicle speeds, acceleration, vehicle moving paths, vehicle driving trajectories, locations, turning signal status (e.g., on-off state of turning signals), braking signal status, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, an object in a field of view of the vehicle, positions of other traffic agents, aggressiveness metrics of other vehicles, etc.

In particular embodiments, the vehicle system may collect contextual data of the surrounding environment using one or more sensors or sensing systems. In particular embodiments, the vehicle system may collect data related to road conditions or one or more objects of the surrounding environment, for example, but not limited to, road layout, pedestrians, other vehicles, traffic status (e.g., number of nearby vehicles, number of pedestrians, traffic signals), time of day (e.g., morning rush hours, evening rush hours, non-busy hours), type of traffic (e.g., high speed moving traffic, accident events, slow moving traffic), locations (e.g., GPS coordination), road conditions (e.g., constructing zones, school zones, wet surfaces, ice surfaces), intersections, road signs (e.g., stop sign, road lines, cross walk), nearby objects (e.g., road curbs, light poles, billboard), buildings, weather conditions (e.g., raining, fog, sunny, hot weather, cold weather), or any suitable objects or agents in the surrounding environment. In particular embodiments, the contextual data of the vehicle may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), driving trajectories of other vehicles, motions of other traffic agents, speeds of other traffic agents, moving directions of other traffic agents, signal statuses of other vehicles, etc. In particular embodiments, the vehicle system may determine a perception of the surrounding environment based on the contextual data collected through one or more sensors in real-time and/or based on previously collected contextual data stored in a database. In particular embodiments, the contextual data of the vehicle may include navigation data of the vehicle, for example, a navigation map, a navigating target place, a route, an estimated time of arriving, a detour, etc.

In particular embodiments, the system may use a rule-based classification algorithm to identify and classify scenarios encountered by the vehicle into a number of categories. In particular embodiments, the system may capture one or more images of the surrounding environment using one or more cameras (e.g., optical cameras, thermal cameras, stereo cameras, LiDARs). The system may generate an image raster of the perceived scenario and analyze the pixels within the image raster to automatically categorize the associated scenarios. The system may determine, using computer vision algorithms and based on the series of images, a pattern that matches a pre-determined pattern associated with a particular type of scenario. The system may identify and classify the current scenario into a scenario category corresponding to that particular type of scenario. For example, the system may use the computer vision algorithm to recognize one or more vehicles parking on the road side with red flares and emergency warning signs. The system may determine that the vehicle is encountering vehicle-on-roadside scenario. As another example, the system may use the computer vision algorithm to recognize that one or more bicycles are moving in front of the vehicle and are sharing the same lane. The system may determine that the vehicle is encountering a bicycle passing scenario. The system may identify that this is the beginning moment of the bicycle passing scenario. As another example, the system may use the computer vision algorithm to recognize one or more damaged vehicles or other obstacles blocking one or more lanes of the road. The system may determine that the vehicle is encountering a vehicle accident scenario caused by other vehicles in the surrounding environment.

In particular embodiments, the system may determine a current geographic location using GPS coordinates, a navigation map, a pattern or feature identified from images, a navigation route, etc. The system may determine, based on pre-determined knowledge associated with that particular geographic location, that the vehicle is encountering a particular type of scenario. The system may identify and classify the current scenario into a scenario category corresponding that particular type of scenario. For example, the system may determine that the vehicle is currently near to and approaching an intersection. The system may determine that the vehicle needs to make a right turn at this intersection based the navigation route of the vehicle. The system may determine that the right turn will be an unprotected right turn based on a map of this intersection. The system may determine that the vehicle is encountering an unprotected right turn scenario.

In particular embodiments, the system may generate a number of scenario models for a number of pre-determined scenario categories and store these scenario models in a database. At running time, the system may identify the current scenario based on the perception data and compare the identified current scenario to the scenario models accessed from the database. The system may determine a probability score of the current scenario belonging to each scenario category based on the comparison between the current scenario and the corresponding scenario model of that category. Then, the system may select the scenario category for the current scenario based on a determination that that scenario category is associated with the highest probability score. In particular embodiments, the scenario models of the pre-determined scenario categories may be generated based on experiential driving data collected by a fleet of autonomous vehicles. In particular embodiments, the scenario models of the pre-determined scenario categories may be generated or adjusted based on experiential knowledge as input by human experts.

In particular embodiments, the system may generate a new scenario category and a new scenario model each time the system identifies an unknown scenario that does not match any scenario models stored in the database and store the new scenario model in the database. The system may update the corresponding scenario model in the database based on the feedback information from human operators (e.g., safety drivers, teleoperators, triage experts) on this scenario category. The feedback information may include additional information related that particular scenario, information that confirms the scenario category, or information that invalidates the scenario category. The feedback information may be received from a human operator through an interaction process which allows the human operator to review and edit the automatically generated disengagement records and triage records. In particular embodiments, with more and more confirmed or invalidated scenario categories and scenario models in the database, the system may more accurately and precisely identify and classify future scenarios based on these pre-determined scenario categories and corresponding scenario models in the database.

In particular embodiments, the rule-based algorithms used by the vehicle system to identify and classify scenarios may include, for example, but are not limited to, a pattern matching algorithm, a time-series matching algorithm, etc. The rules used by the rule-based algorithm may include one or more fuzzy rules as input or set by human experts. For example, the rule-based algorithm may identify a series of features of the surrounding environment over time that match a pre-determined series of features associated with a particular scenario that warrants triggering a disengagement operation. As another example, the rule-based algorithm may identify a pattern with a pre-determined time frame that matches a pre-determined pattern associated with a particular scenario that warrant triggering a disengagement operation. In particular embodiments, these pre-determined features or patterns may be determined through a feature/pattern mining process on the collected perception data by machine-learning models or/and human experts. As an example and not by way of limitation, human experts may identify a series of key events with a particular time sequence order that warrant a disengagement operation to be triggered and may generate one or more rules based on the series of key events for the rule-based scenario classification algorithm. At run time, when this series of key events with that particular time sequence order is recognized, the system may classify the current scenario into a corresponding scenario category that will trigger an automatic disengagement operation.

In particular embodiments, the system may use a machine-learning (ML) model to classify the scenarios encountered by the vehicle when driving in autonomous driving mode. In particular embodiments, the ML model may be trained during a supervised learning process using a number of pre-labeled scenario samples. The pre-labeled scenario samples may include perception data that are labeled to be associated with particular scenario categories as determined by human experts, other ML models, or computer vision algorithms. Each scenario sample used for training the ML model may include scenario-specific perception data related to a particular scenario category and a pre-determined category label for that particular scenario category. The ML model, once trained, may be fed with the new perception data of the surrounding environment while the vehicle drives in an autonomous driving mode. The ML model may identify and classify the current scenario encountered by the vehicle into a corresponding category based on the perception data. The ML model may output a number of probability scores indicating the likelihood that the current scenario belongs to a number of scenario categories. The ML model may select the scenario category with the highest probability score as the scenario category of the current scenario. In particular embodiments, during the training or inference process, the ML model may be fed with a variety of types of data including, for example, but not limited to, perception data (e.g., bird-view images, rasterized images, LiDAR point cloud, radar signals), map data, GPS data, vehicle computer CPU and memory usage data, in-vehicle temperature, inertial navigation system (INS) data, navigation plan data, vehicle operation and performance data (e.g., speed, acceleration, trajectories), vehicle control signals, computed data based on other types of data, etc.

In particular embodiments, the ML model may be trained during an unsupervised learning process using previously collected perception data associated with a number of scenarios. The ML model may extract features or patterns from the perception data and cluster scenarios into different groups based on these features or patterns. At run time, the ML model may be fed with new perception data of the vehicle's surrounding environment while the vehicle drives in an autonomous driving mode. The ML model may classify the scenarios encountered by the vehicle into corresponding scenario categories based on the perception data fed to the ML model. The ML model may determine a probability score indicating the likelihood that the current scenario belongs to each possible scenario category and identify the scenario category associated with the highest probability score as the category that the current scenario belongs to. In particular embodiments, the system may use a first ML model to perform cluster analysis on collected perception data to generate the training samples for supervised learning. For example, the first ML model may analyze the collected perception data and groups the associated scenarios into a number of initial categories using cluster analysis. Then, the initial categories may be adjusted (e.g., confirmed, invalidated, modified) by human experts to label the scenarios with corresponding category labels. In particular embodiments, the system may use these labeled scenario samples with corresponding perception data to train a second ML model during a supervised learning process. In particular embodiments, the system may use these labeled scenario samples (as adjusted by human experts) with corresponding perception data to re-train the first ML model during a supervised learning process.

In particular embodiments, the ML model may be directly fed with images or other sensor data for classifying the associated scenarios based on these images or sensor data. As an example and not by way of limitation, the system may generate one or more bird-view images of the vehicle's surrounding environment and feed these bird-view images to the ML model. The ML model may identify and classify a current scenario encountered by the vehicle based on these bird-view images. In particular embodiments, the system may identify one or more objects or features (e.g., pedestrians, other vehicles, road signs, traffic signals) in the surrounding environment of the vehicle based on one or more images or sensor data of the surrounding environment and feed these identified objects or features to the ML model which classifies the associated scenarios into corresponding categories based on these identified objects. In particular embodiments, these objects may be identified using one or more computer vision algorithms (e.g., object recognition algorithms) or other ML models for object recognition.

Figure 2A:
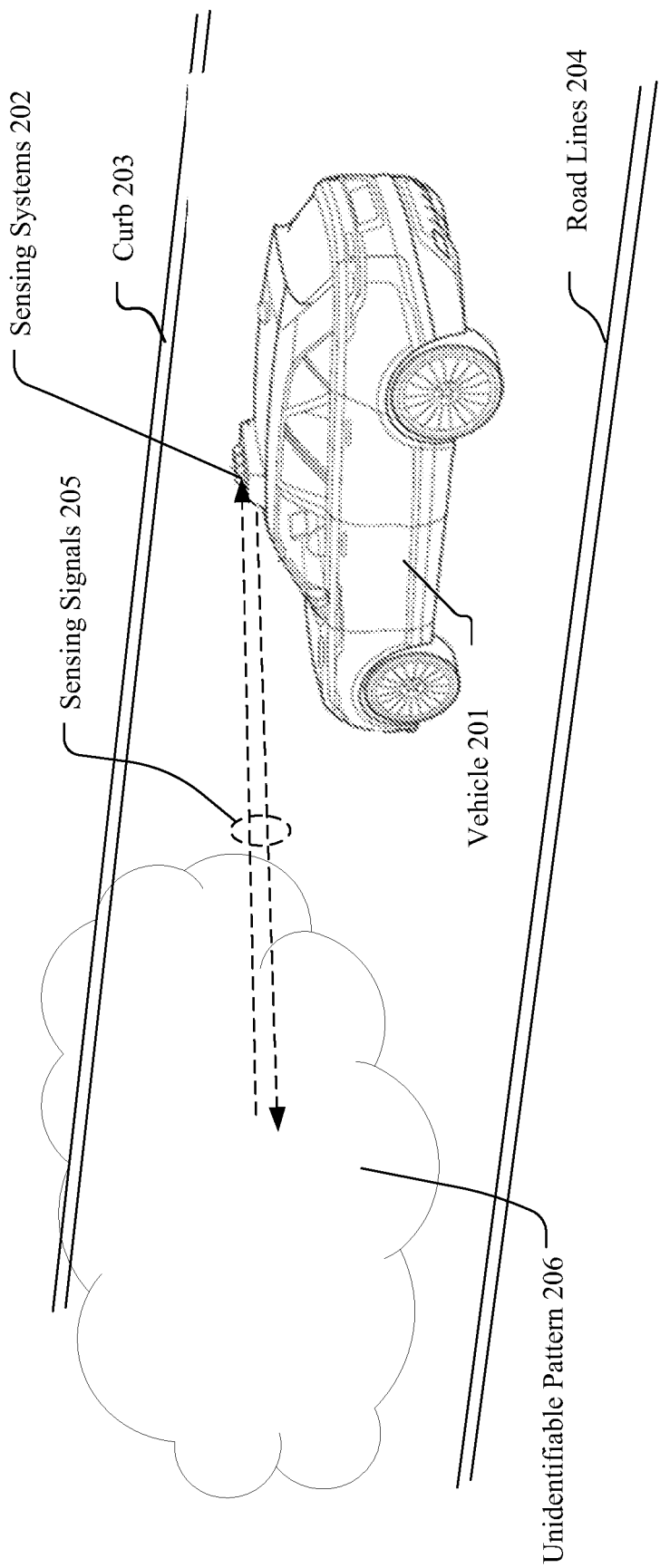
FIG. 2A illustrates an example scenario that is unidentifiable by the vehicle system.

FIG. 2A illustrates an example scenario 200A that is unidentifiable by the vehicle system. As an example and not by way of limitation, the autonomous vehicle 201 may use one or more sensors or sensing systems 202 to monitor the surrounding environment (e.g., road lines 204, road curb 203) and navigate in the environment using an autonomous driving mode. The system may identify an unidentifiable pattern 206 in the surrounding environment of the vehicle based on the sensing signals 205 (e.g., LiDAR data, images, radar data). In particular embodiments, the unidentifiable pattern 206 may be caused by or related to, for example, but not limited to, smog or vapor, an unknown object dropped by other vehicles, a paint on the back of other vehicles, a crack pattern of road surface, etc. The system may use a computer vision algorithm or a ML model to analyze the images and other sensor data associated with the unidentifiable pattern 206 but cannot recognize what it is. The system may compare the unidentifiable pattern 206 to a number of object models stored in a database and determine that the unidentifiable pattern 206 does not match any pre-determined models stored in the database. In particular embodiments, the system may try to classify the current scenario using a rule-based algorithm or a ML model. The system may determine the probability scores indicating the likelihood that the current scenario belongs to a number of scenario categories and determine a confidence score for the classification result. For the current scenario with the unidentifiable pattern 206, the probability scores for the current scenario to belong to all possible scenario categories may be lower than a pre-determined probability threshold and the confidence score of the classification result may be lower than a pre-determined confidence threshold. As a result, the system may not able to determine the scenario category of the current scenario and may classify the current scenario as an unidentifiable scenario or unknown scenario.

In response to a determination that the current scenario is an unidentifiable scenario, the system may allow the vehicle to continue to drive in the autonomous driving mode and allow the human operator (e.g., a safety driver, a teleoperator) to decide whether and when to disengage the vehicle from autonomous driving. In particular embodiments, the system may automatically send an alert message to the human operator (e.g., a safety driver, a teleoperator) to inform the human operator that an unidentifiable scenario is encountered by the vehicle. The alert message to the human operator may include information related to one or more unidentifiable objects, features, or patterns in the surrounding environment. For example, the alert message may include a location and size (e.g., a bounding box) of an unidentifiable object in front of the vehicle as detected by one or more cameras. The information included in the alert message may allow the human operator to be informed of such situation to quickly locate/recognize the unidentifiable object and respond accordingly.

In particular embodiments, each time the vehicle encounter an unidentifiable scenario, the system may generate a new scenario category and a new scenario model based on the perception data associated with the unidentifiable scenario. The system may store the new scenario model corresponding to the new scenario to the scenario database. The new scenario model may be incomplete at this moment because of lacking accurate category information. However, the system may update this new scenario model based on the feedback information from the human operator. In particular embodiments, the system may automatically generate a scenario record for the unidentifiable scenario encountered by the vehicle in autonomous driving mode. The record may include the perception data of the surrounding environment, the message sent to the human operator (e.g., a location and size of an unidentifiable object), the response of the human operator (e.g., whether and when the human operator disengage the vehicle from autonomous driving) to the unidentifiable scenario, etc.

In particular embodiments, the system may allow or initiate an interaction with the human operator to allow the human operator to provide feedback information on the generated scenario record for this unidentifiable scenario. The feedback information provided by the human operator may include information that clarifies the object identification or type of the unidentifiable object, the category information of this unidentifiable scenario, the reasons why the human operator disengages or does not disengage the vehicle from autonomous driving under this particular scenario. After the system receives the feedback information from the human operator, the system may update the corresponding new scenario model stored in the database based on this feedback information. The data of the new scenario model as updated based on the feedback information may be used to generate new rules for a rule-based classification algorithm or to train a ML model for classifying future scenarios that are the same or similar to this scenario. The rules-based classification algorithm or ML model, once updated based on the new scenario data, may be capable of identifying and classifying scenarios that are the same or similar to this particular scenario. In particular embodiments, the system may generate a new scenario category with corresponding scenario model and a scenario record each time the vehicle encounters an unidentifiable scenario while driving in the autonomous driving mode. In particular embodiments, the system may generate a new scenario category, a corresponding scenario model, and a scenario record for the unidentifiable scenario only when the human operator actually disengaged the vehicle from autonomous driving in response to the unidentifiable scenario.

In particular embodiments, the system may update the database corresponding to the operational design domain of the vehicle by adding the scenarios learned from the unidentifiable scenarios encountered by the vehicle. In particular embodiments, the database corresponding to the operational design domain of the vehicle may include a large number of scenarios that cover most of the possible scenarios that the vehicle could encounter and may allow the system to be able to automatically handle unknown or unidentifiable scenarios encountered by the vehicle. In particular embodiments, in response to a determination that the current scenario is an unidentifiable scenario, the system may automatically trigger a disengagement operation related to disengaging the vehicle from autonomous driving. For example, in response to a determination that the current scenario cannot by identified, the system may automatically send the human operator (e.g., a safety driver or a teleoperator) to alert the human operator that the vehicle will be disengaged from autonomous driving within a short time period (e.g., 3-5 seconds) and the human operator needs to take over the control the vehicle. In particular embodiments, the system may slow down the speed of the vehicle (e.g., to a safe speed) or fully stop the vehicle before the human operator takes over the control. Then, the system may automatically disengage the vehicle from autonomous driving and generate a disengagement record and a triage record based on the perception data associated with the unidentifiable scenario.

In particular embodiments, the system may monitor the vehicle operations and collect the vehicle operation data as controlled by the human operator after the vehicle is disengaged from the autonomous driving mode (whether the vehicle is manually disengaged by the human operator or automatically disengaged by the system). The collected vehicle operation data may include, for example, vehicle moving trajectories (e.g., each trajectory having a series of velocities over time), acceleration operations, braking operations, signal status, etc. The system may include the vehicle operation data in the vehicle disengagement record and triage record, together with the perception data associated with this particular scenario. The system may feed the vehicle operation data and perception data included in the disengagement record and triage record to the planning system of the vehicle to allow the planning system to learn how to generate navigation plans for navigating the vehicle under this scenario. The planning system, once re-trained, may be capable of generating navigation plans that can navigate the vehicle under future scenarios that are the same or similar to this particular scenario.

In particular embodiments, the system may determine that the vehicle has encountered a new scenario that is an unidentifiable scenario to the system. In response to the new scenario being an un-identifiable scenario, the system may automatically disengage the vehicle from the autonomous driving mode. The system may generate a new disengagement record including perception data associated with the un-identifiable scenario. Then, the system may receive feedback information related to the unidentifiable scenario from an operator. The system may identify that previously unidentifiable scenario as a particular scenario based on the operator feedback. The system may associate the perception data associated with the previously undeniable scenario included in the disengagement record to that particular scenario based on the operator feedback. The system may collect more perception data and human driving data associated with that particular scenario category and use the collected data to train the system to automatically handle that particular scenario (e.g., by generating qualified navigation plans for navigating the vehicle under this type of scenarios). In particular embodiments, in response to determining a new scenario being that particular scenario, the system may navigate the vehicle in the autonomous driving mode in accordance with a navigation plan generated by the vehicle for navigating the vehicle in accordance with this particular scenario.

Figure 2B:
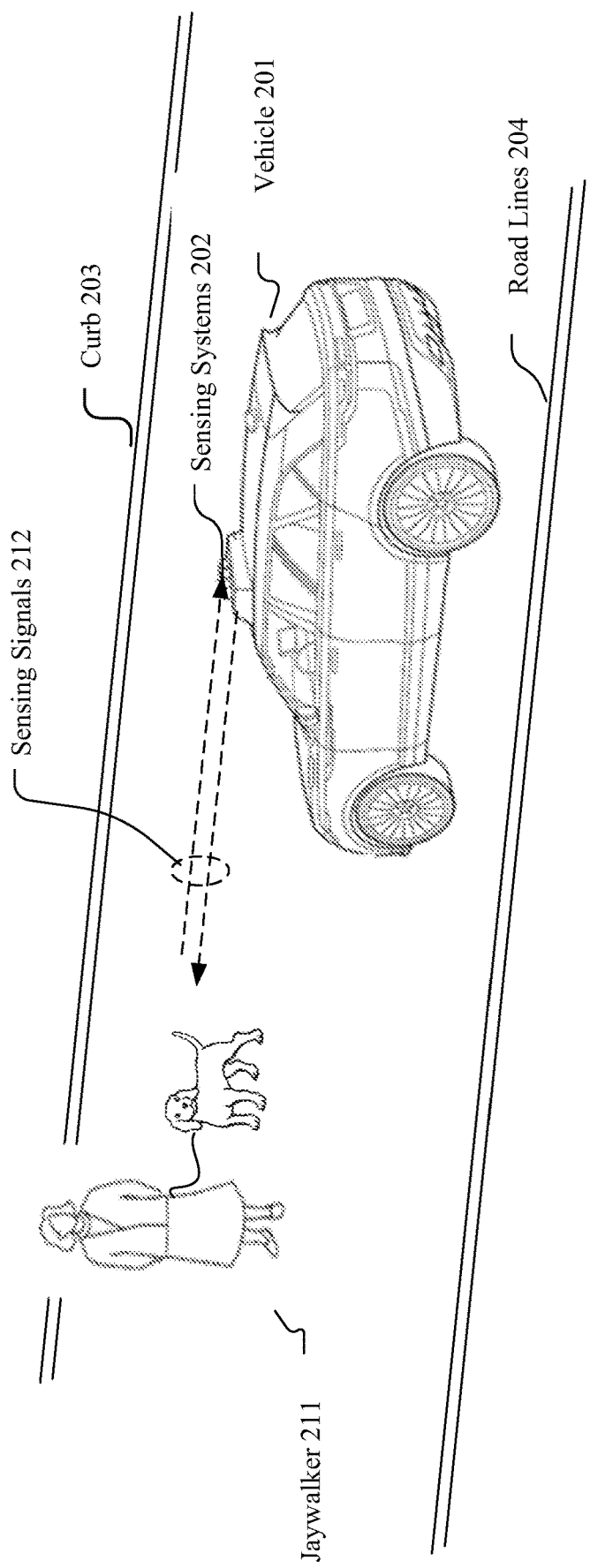
FIG. 2B illustrates an example identifiable scenario that is not supported by the planning system of the autonomous vehicle.

FIG. 2B illustrates an example identifiable scenario 200B that is not supported by the planning system of the autonomous vehicle. As an example and not by way of limitation, the vehicle 201 may use the sensing system 202 to monitor the surrounding environment (e.g., road lines 204, road curb 203) to navigate the vehicle using an autonomous driving mode. The system may detect a jaywalker 211 (e.g., a pedestrian with a pet) based on sensing signal 212 of one or more of the sensing systems 202. The system may identify that the vehicle is encountering a jaywalker scenario. The system may compare the identified jaywalker scenario to a number of scenarios stored in a database corresponding to an operational design domain of the vehicle system. The database corresponding to the operational design domain of the vehicle system may include all scenarios that are supported by the planning system of the vehicle. In other words, the planning system of the vehicle may be capable of generating navigation plans for each scenario stored in the database corresponding to the operational design domain of the vehicle (but may not be capable for generating navigation plans for the scenarios that are not included in the database corresponding to the operational design domain). In particular embodiments, the operation design domain of the vehicle may include a number of scenarios including, for example, but not limited to, unprotected left turns, yielding to oncoming traffic, un-protected right turn, passing bicycles, merging lanes, vehicle accidents, etc. By comparing the jaywalker scenario to the scenarios stored in the database, the system may determine that the jaywalker scenario is not included in the database corresponding to the operation design domain of the vehicle system and therefore is not supported by the planning system of the vehicle.

Figure 2C:
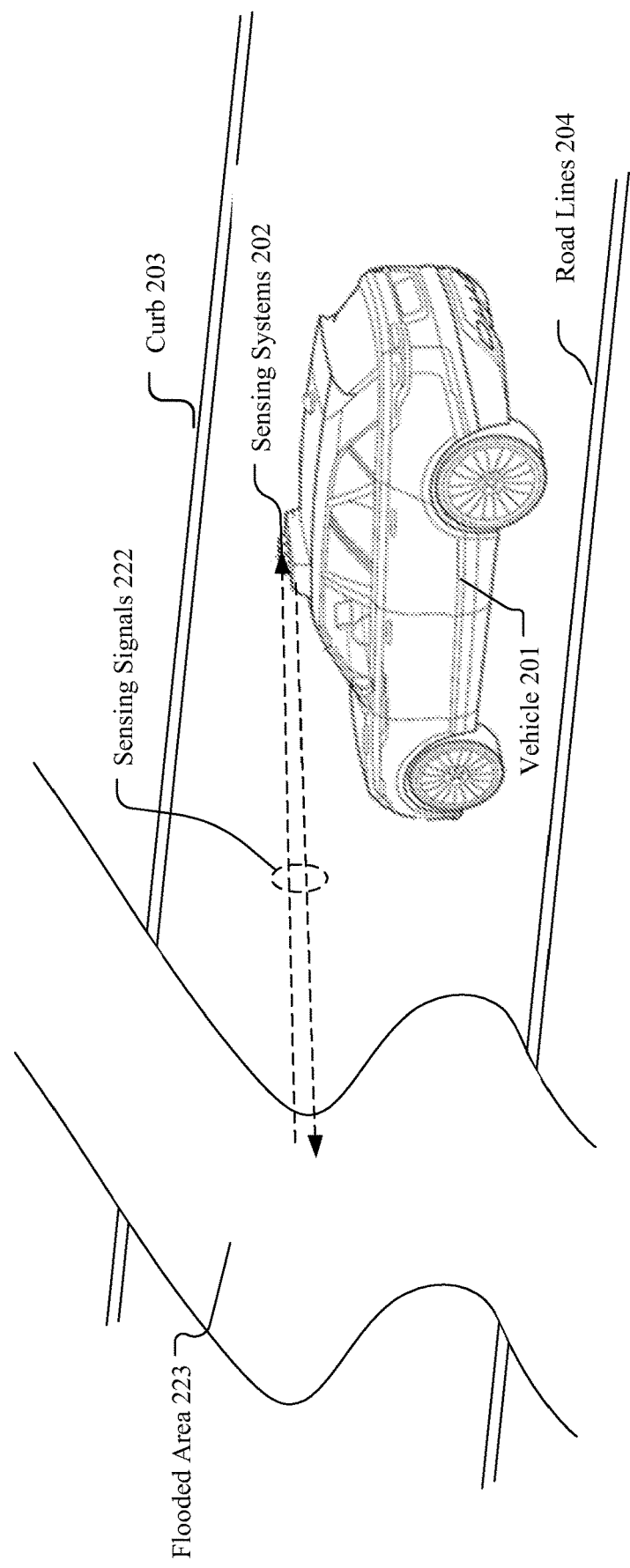
FIG. 2C illustrates another example scenario that is not supported by the planning system of the autonomous vehicle.

FIG. 2C illustrates another example scenario 200C that is not supported by the planning system of the autonomous vehicle. As an example and not by way of limitation, the vehicle 201 may use the sensing system 202 to monitor the surrounding environment (e.g., road lines 204, road curbs 203) to navigate the vehicle using an autonomous driving mode. The system may detect a flooded area 223 on the road based on sensing signals 222 of one or more of the sensing systems 202. The system may identify that the vehicle is encountering a flooded-road scenario. The system may compare the flooded-road scenario to a number of scenarios stored in a database corresponding to an operational design domain of the vehicle system. The planning system of the vehicle may be capable of generating navigation plans for each scenario stored in the database corresponding to the operational design domain of the vehicle but may not be capable for generating navigation plans for the scenarios that are not included in the database corresponding to the operational design domain. By comparing the flooded-road scenario to the scenarios stored in the database, the system may determine that the flooded-road scenario is not included in the database corresponding to the operation design domain of the vehicle system and therefore is not supported by the planning system of the vehicle.

In particular embodiments, in response to a determination that the current scenario is a known scenario that is not supported by the planning system of the vehicle, the system may automatically trigger a disengagement operation related to disengaging the vehicle from autonomous driving. For example, in response to a determination that the current scenario is excluded from the database corresponding to the operational design domain of the vehicle, the system may automatically send an alert message to the human operator (e.g., a safety driver or a teleoperator) to alert the human operator that the vehicle will be disengaged from autonomous driving within a short time period (e.g., 3-5 seconds) and the human operator needs to take over the control the vehicle. In particular embodiments, the system may slow down the speed of the vehicle (e.g., to a safe speed) or full stop the vehicle before the human operator takes over the control. Then, the system may automatically disengage the vehicle from the autonomous driving and generate a disengagement record and a triage record based on the current scenario encountered by the vehicle.

In particular embodiments, when the system automatically disengages the vehicle from the autonomous driving in response to a determination that the vehicle encounters an unsupported scenario, the system may automatically generate a disengagement record based on the scenario encountered by the vehicle. The disengagement record may include the perception data associated with that particular scenario. In particular embodiments, the system may allow or initiate an interaction with the human operator to allow the human operator to provide feedback information on the generated disengagement record. The feedback information provided by the human operator may include information that that confirms or disconfirms the scenario category of the identified scenario. After the scenario category is confirmed or disconfirmed based on the feedback from the human operator, the system may use the scenario-specific data (e.g., perception data, confirmed scenario category) associated with this particular scenario to improve the classification algorithms of the system for more accurately and precisely classifying future scenarios. For example, the system may generate one or more new rules for a rule-based classification algorithm or re-train a ML model based on the scenario-specific data associated with the identified scenario. The rules-based classification algorithm or ML model, once updated based on the identified scenario, may more accurately and precisely classify scenarios that are the same or similar to this particular scenario.

In particular embodiments, the system may monitor the vehicle operations and collect the vehicle operation data as controlled by the human operator after the vehicle is disengaged from the autonomous driving mode. The collected vehicle operation data may include, for example, vehicle moving trajectories (e.g., each trajectory having a series of velocities over time), acceleration operations, braking operations, signal status, etc. The system may include the vehicle operation data in the vehicle disengagement record and triage record, together with other scenario-specific data (e.g., perception data) associated with this scenario. The system may feed the vehicle operation data and other scenario-specific data included in the disengagement record and triage record to the planning system of the vehicle to allow the planning system to learn how to navigate the vehicle under this scenario. The planning system, once re-trained, may be capable of generating navigation plans that can navigate the vehicle according to future scenarios that are the same or similar to the identified scenario.

Figure 2D:
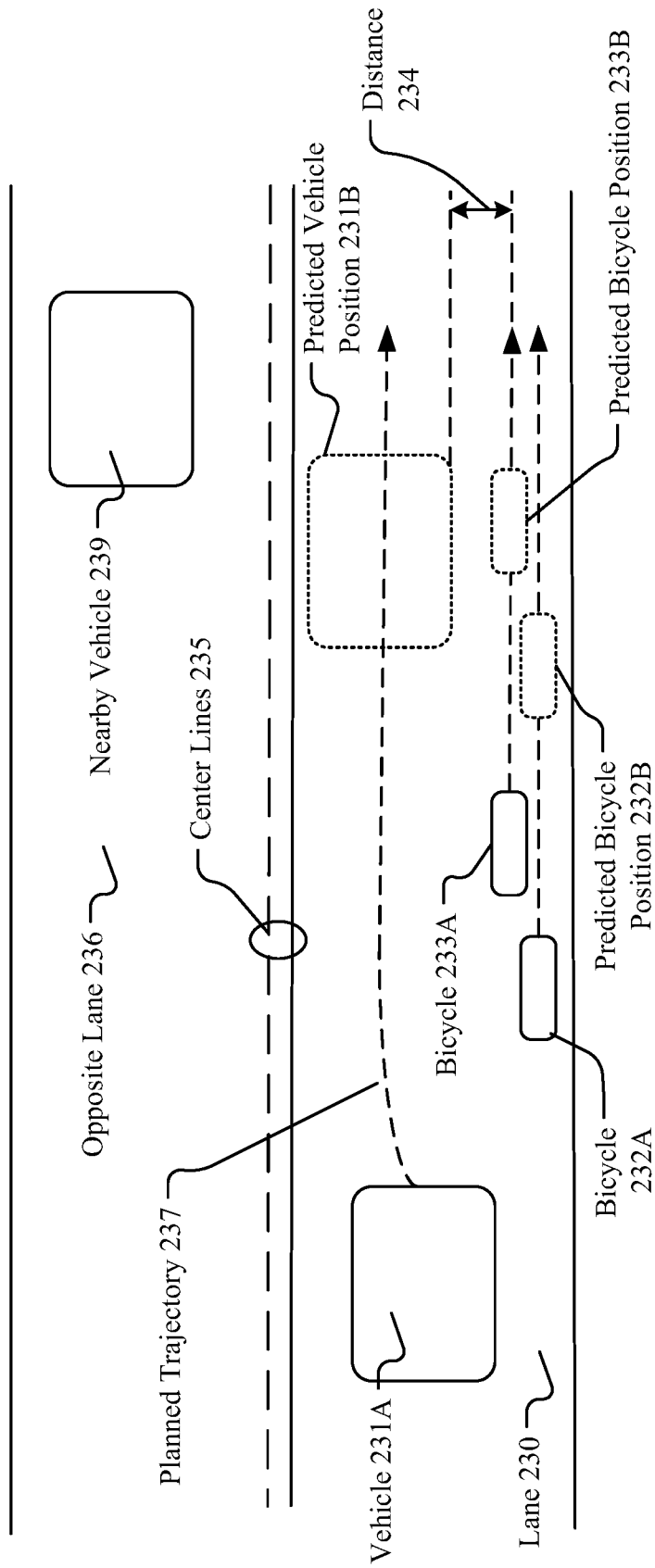
FIG. 2D illustrates an example scenario that is supported by the planning system of the vehicle and an example planned trajectory for navigating the vehicle according to this scenario.

FIG. 2D illustrates an example scenario 200D that is supported by the planning system of the vehicle and an example planned trajectory 237 for navigating the vehicle according to this scenario. As an example and not by way of limitation, the vehicle 231A may be driving in the road lane 230 under an autonomous driving mode. The vehicle 231A may identify, based on the perception data, two bicycles 232A and 233A that are moving in the same direction in the same lane 230. The system may determine that the vehicle 231A is encountering a bicycle-passing scenario. The system may compare the identified bicycle-passing scenario with the scenarios stored in a database corresponding to the operation design domain of the vehicle. The system may determine that the bicycle-passing scenario is included in the database, and therefore is supported by the planning system for generating navigation plans. The system may feed the perception data to the planning system to generate a navigation plan for navigating the vehicle according to this bicycle-passing scenario. The navigation plan generated by the planning system may include a planned trajectory 237 which is associated with a series of velocities over time along the planned trajectory 237. The planned trajectory 237 may be generated by taking into consideration the positions and predicted moving trajectories of the bicycles 232A and 233A, the center lines 235 that does not allow vehicles to cross from the lane 230 to the opposite lane 236, the nearby vehicle 239 and other traffic in the opposite lane 236, etc.

In particular embodiments, in response to a determination that the current scenario is covered by the operational design domain of the vehicle, the system may evaluate the navigation plan that is generated by the planning system to navigate the vehicle according to the current scenario. The system may determine one or more vehicle performance metrics for the generated navigation plans based on the current scenario. The system may determine whether these vehicle performance metrics meet one or more pre-determined criteria required for safely navigating vehicle. When the vehicle performance metrics fail to meet the pre-determined criteria, the system may automatically trigger a disengagement operation for disengaging the vehicle from the autonomous driving mode. When the vehicle performance metrics meet the pre-determined criteria, the system may keep the vehicle to continue to drive in the autonomous driving mode. In particular embodiments, the pre-determined criteria for evaluating vehicle performance with different vehicle navigation plans may include, for example, but are not limited to, a distance from a vehicle to another agent or object (e.g., vehicles, pedestrians, bicycles, pets, road lanes, road curbs) being greater than or equal to a pre-determined threshold distance (e.g., 3 meters), a moving speed at a particular location being slower than a pre-determined threshold speed or being within a pre-determined range for speed, an acceleration or deceleration being within a pre-determined range for acceleration, a turning radius being with a pre-determined range for turning radius, a relative speed with respect to a nearby object being within a pre-determined range for relative speed, etc.

For the scenario example as illustrated in FIG. 2D, the system may determine a predicted vehicle position 231B when the vehicle 231A passes the two bicycles 232A and 233A which are predicted to be at the positions of 232B and 233B at the passing moment. The system may determine the smallest distance between the vehicle 231A and the two bicycles 232A and 233A if the vehicle is navigated based on the planned trajectory 237. The system may determine the smallest distance based on the distance 234 between the predicted vehicle position 231B and the predicted bicycle position 233B corresponding to a closer bicycle to the vehicle. The predicted vehicle position 231B may be determined based on the planned trajectory 237 and the predicted bicycle positions 232B and 233B may be determined based on the predicted trajectories of the two bicycles 232A and 233A. The system may compare the distance 234 to a pre-determined threshold that is needed to safely navigate the vehicle. In this example, the system may determine that the distance 234 is smaller than the pre-determined threshold for safely navigate the vehicle and therefore fails to meet the pre-determined criteria for safely navigate the vehicle.

In particular embodiments, in response to a determination that one or more vehicle performance metrics fail to meet the pre-determined criteria for safely navigating the vehicle, the system may automatically trigger a disengagement operation related to disengaging the vehicle from the autonomous driving mode. For the example as illustrated in FIG. 2D, when the system determines that the distance 234 is smaller than the pre-determined threshold for safely navigate the vehicle, the system may automatically trigger the disengagement operation to disengage the vehicle from autonomous driving. For example, the system may automatically send an alert message to the human operator (e.g., a safety driver or a teleoperator) to alert the human operator that the vehicle will be disengaged from autonomous driving within a short time period (e.g., 3-5 seconds) and the human operator needs to take over the control of the vehicle. In particular embodiments, the system may slow down the speed of the vehicle (e.g., to a safe speed) or fully stop the vehicle before the human operator takes over the control. Then, the system may automatically disengage the vehicle from the autonomous driving and generate a disengagement record and a triage record based on the current scenario encountered by the vehicle.

In particular embodiments, when one or more vehicle performance metrics fail to meet the pre-determined criteria for safely navigating the vehicle, the system may determine a confidence score for the vehicle performance evaluation result indicating the confidence level of the vehicle evaluation result. The system may compare the confidence score of the vehicle performance evaluation result to a pre-determined threshold. When the confidence score is above or equal to the pre-determined threshold, the system may automatically disengage the vehicle from the autonomous driving mode. When the confidence score is below the pre-determined threshold, the system may send an alert message to the human operator to inform the human operator the vehicle performance evaluation result and allow the human operator to decide whether and when to disengage the vehicle from the autonomous driving mode. In particular embodiments, the system may receive from the human operator feedback information that confirms or disconfirms the identified scenario included in the disengagement record. Then, the system may use the information from the disengagement record and triage record to adjust or modify the scenario classification algorithm for classifying future scenarios more accurately and precisely. The system may collect the vehicle operation data as controlled by the human operator after the vehicle is disengaged from the autonomous driving mode and use the collected data to re-train the planning system to allow the planning system to learn how to generate navigation plans that can meet the pre-determined criteria for safely navigating the vehicle.

Figure 2E:
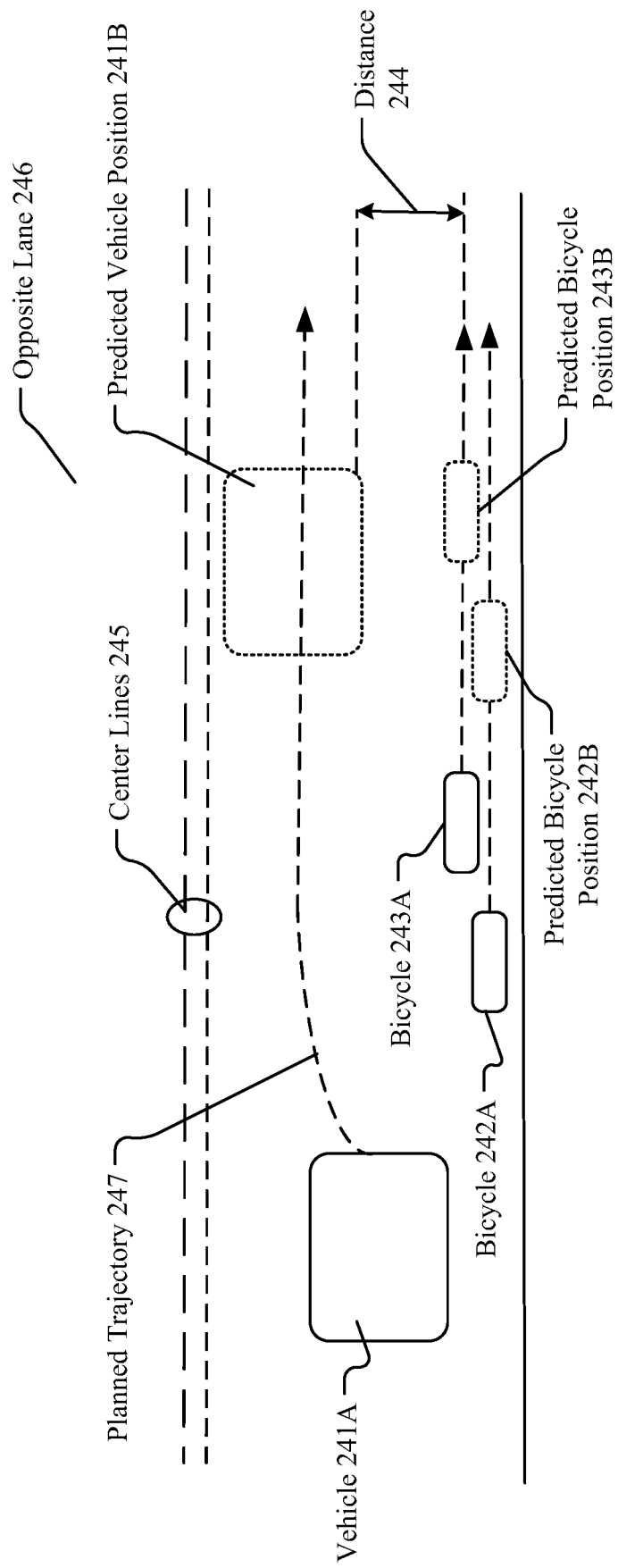
FIG. 2E illustrates another example scenario that is supported by the planning system of the vehicle and an example planned trajectory for navigating the vehicle according to this scenario.

FIG. 2E illustrates another example scenario 200E that is supported by the planning system of the vehicle and an example planned trajectory 247 for navigating the vehicle according to this scenario. As an example and not by way of limitation, the vehicle 241A may identify two bicycles 242A and 243A that are moving in the same direction in the same lane. The system may determine that the vehicle 241A is encountering a bicycle-passing scenario. The system may compare the identified bicycle-passing scenario with the scenarios stored in a database corresponding to the operation design domain of the vehicle and determine that the bicycle-passing scenario is included in the database, and therefore is supported by the planning system. The system may feed the perception data to the planning system to generate a navigation plan for navigating the vehicle under this bicycle-passing scenario. The navigation plan generated by the planning system may include a planned trajectory 247 and a series of velocities over time along the planned trajectory 247. The system may determine the smallest distance between the vehicle 241A and the two bicycles 242A and 243A if the vehicle is navigated based on the planned trajectory 247.

In this example scenario, the system may determine a predicted vehicle position 241B when the vehicle 241A passes the two bicycles 242A and 243A which are predicted to be at the positions of 242B and 243B at the passing moment. The system may determine the smallest distance based on the distance 244 between the predicted vehicle position 241B and the predicted bicycle position 243B corresponding to the bicycle closer to the vehicle. The predicted vehicle position 241B may be determined based on the planned trajectory 247 and the predicted bicycle position 242B and 243B may be determined based on the predicted trajectories of the two bicycles 242A and 243A. The system may compare the distance 244 to a pre-determined threshold that is needed to safely navigate the vehicle. In this example, the system may determine that the distance 244 is greater than or equal to the pre-determined threshold for safely navigating the vehicle. Therefore, the system may determine that the navigation plan, generated by the planning system for navigating the vehicle according to the current scenario, meets the pre-determined criteria for safely navigating the vehicle under this scenario. The system may allow the vehicle to continue to drive in the autonomous driving mode. FIG. 2E further shows a center lane 245 and an opposite lane 246.

In particular embodiments, the system may identify a scenario encountered by the vehicle while driving in the autonomous driving mode. The system may determine, based on the identified scenario, that the vehicle does not need to be disengaged from the autonomous driving mode for this scenario. For example, the system may determine the vehicle performance with the current navigation plan generated by the planning system meet the pre-determined criteria for safely navigating the vehicle according to this scenario. However, for some unknown reasons to the system, the human operator may trigger the disengagement operation and disengage the vehicle from the autonomous driving mode. In response to an unexpected disengagement triggered by the human operator, the system may monitor and record the vehicle operations as controlled by the human operator and collect the related perception data. The system may generate disengagement and triage records which may be marked as operator triggered disengagement and may include the vehicle operation data and perception data associated with scenario. The system may feed the perception data and vehicle operation data included in the disengagement and triage records to the classification algorithms and the planning system to allow the system to learn how to handle future scenarios that are the same or similar to this particular scenario.

In particular embodiments, the vehicle may encounter multiple scenarios concurrently in the surrounding environment while the vehicle is driving in the autonomous driving mode. As an example and not by way of limitation, the vehicle may encounter a bicycle-passing scenario and an unprotected right turn scenario at the same time. The system may identify the scenarios encountered by the vehicle based on the perception data and compare the identified scenarios to the scenarios stored in the database corresponding to the operational design domain of the vehicle. The system may identify multiple scenario models in the database that could potentially match the identified scenario. The system may determine a confidence score for each of matching scenario model in the database based on the degree of matching between that scenario model to the corresponding identified scenario. A higher confidence score may indicate a higher degree of matching between the scenario model and the corresponding scenario. The system may select the scenario that is associated with the higher confidence score to determine whether to disengage the vehicle from the autonomous driving mode.

In particular embodiments, the system may determine an importance score for each of the identified scenarios. The importance score may be determined based on a severeness degree of each scenario. A higher importance score may be correlated to a higher degree of severeness for the associated scenario. The system may select the scenario that is associated with the higher importance score as the scenario to be used for determining whether to disengage the vehicle from the autonomous driving mode. For example, the vehicle may encounter two concurrent scenarios one of which has a greater probability to create a safety problem. The system may assign a higher importance score for that scenario and may determine whether to disengage the vehicle from autonomous driving based on that scenario with the higher importance score. In particular embodiments, the system may determine an occurring frequency for each of the identified concurrent scenarios and weigh these scenarios based on the occurring frequencies and other contextual information of these scenarios. In particular embodiments, the system may select a scenario from multiple concurrent scenarios to determine the responsive operations (e.g., whether to disengage the vehicle from autonomous driving) based on a combination of factors associated with the scenarios including, for example, but not limited to, confidence scores, importance scores, severeness scores, occurring frequencies, etc.

In particular embodiments, the system may include an automatic co-pilot system that is trained to handle edge scenarios (e.g., unknown scenarios or/and scenarios that are not included in the operational design domain of the vehicle). In particular embodiments, when the system identified an unknown scenario or a scenario that is not covered by the operational design domain of the vehicle, the system may automatically trigger the disengagement operation related to disengaging the vehicle from the autonomous driving mode. Instead of sending an alert message to the human operator and allowing the human operator to take over the control of the vehicle, the system may send a trigger signal to an automatic co-pilot system to allow the co-pilot system to take over the control the vehicle. The automatic co-pilot system may include navigation algorithms (e.g., ML models) that are trained to handle unknown scenarios or the scenarios that are not included in the operational design domain of the vehicle. The automatic co-pilot may be trained using the scenario data and vehicle operation data included in the disengagement records and triage records generated for former unknown scenarios and scenarios that are not included by the operational design domain.

In particular embodiments, the system may feed the scenario-specific data including vehicle performance data for the scenarios, that are included in the operational design domain, to the planning system of the vehicle to allow the planning system to learn how to handle these scenarios more accurately and precisely. In particular embodiments, the system may feed the scenario-specific data including vehicle performance data for the unknown scenarios and unsupported scenario to the automatic co-pilot to allow the automatic co-pilot to learn how to handle the same or similar scenarios more accurately and precisely. The system may continuously or periodically update the operational design domain and the automatic co-pilot system. By training these two systems separately, the system may allow both systems (the planning system and the co-pilot system) to improve on their ability (e.g., accuracy and precision) to handle respective scenarios without affecting each other.

Figure 3A:
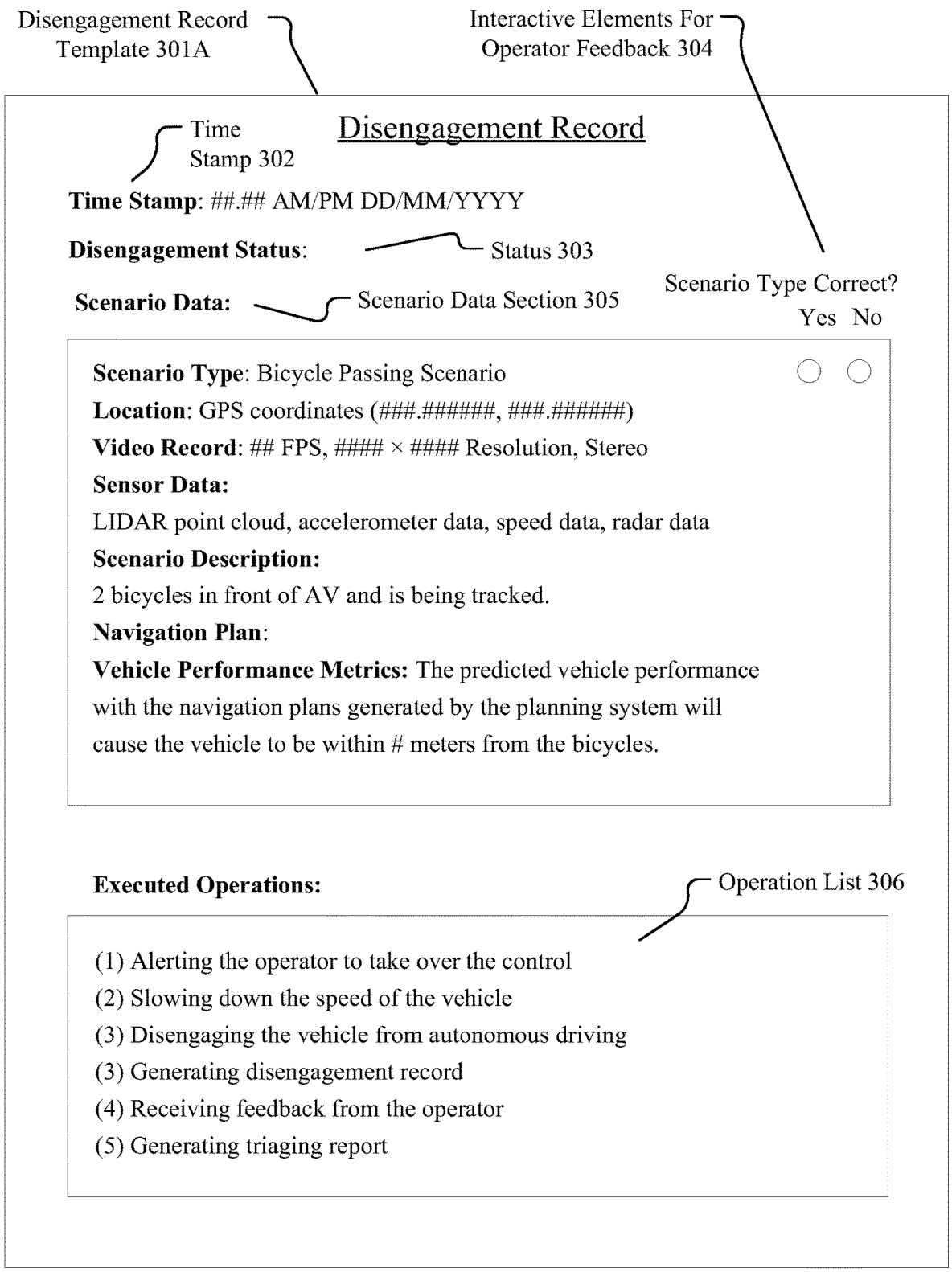
FIG. 3A illustrates an example template used for generating a disengagement record for a particular scenario encountered by the vehicle.

FIG. 3A illustrates an example template 301A used for generating a disengagement record for a particular scenario encountered by the vehicle. In particular embodiments, after the system has determined that the automatic disengagement operation needs to be triggered, the system may send related information (e.g., scenario data, perception data, vehicle performance evaluation result, vehicle performance metrics, etc.) to a disengagement prediction module (e.g., the disengagement prediction module 125 in FIG. 1B) to trigger the disengagement operation. The disengagement prediction module may be a rule-based logic module that can (1) trigger the disengagement operation based on the rule-based logic and input information to the module; and (2) automatically fill the disengagement record template to generate the disengagement record for the current scenario.

As an example and not by way of limitation, the vehicle may encounter a bicycle passing scenario as illustrated in FIG. 2D while driving in the autonomous driving mode. The system may retrieve, from a database, a disengagement record template 301A for the bicycle passing scenario. In this example, the disengagement record template 301A may include a number of sections and a number of elements including, for example, but not limited to, a time stamp 302, a disengagement status 303, interactive elements for operator feedback 304, a scenario data section 305, an executed operation list 306, etc. In particular embodiments, the scenario data section 305 may include a number of data elements including, for example, but not limited to, a scenario type (e.g., bicycle passing scenario), a location (e.g., GPS coordinates), a video record (e.g., FPS, resolution), sensor data (e.g., LiDAR point cloud), a scenario description (e.g., including the number of identified bicycles), the navigation plan generated to navigate the vehicle, vehicle performance metrics (e.g., a distance to the closest bicycle if the vehicle drives in the autonomous driving mode using the navigation plan), vehicle performance evaluation results, etc. In particular embodiments, the scenario description may include a text description for the associated scenario (e.g., the bicycle passing scenario) with one or more place holders (e.g., # for number of bicycles). In particular embodiments, the vehicle performance metrics may include a text description for the vehicle performance evaluation result with one or more place holders (e.g., # for meter number for the distance between the vehicle to the closest bicycle). In particular embodiments, the disengagement operations may include a list of potential operations that could possibly be executed once the disengagement operation is triggered. In particular embodiments, the potential operations may include, for example, but are not limited to, alerting the operator to take over the control, slowing down the speed of the vehicle, disengaging the vehicle from autonomous driving, generating disengagement record, receiving feedback from the operator, generating triaging record, etc.

Figure 3B:
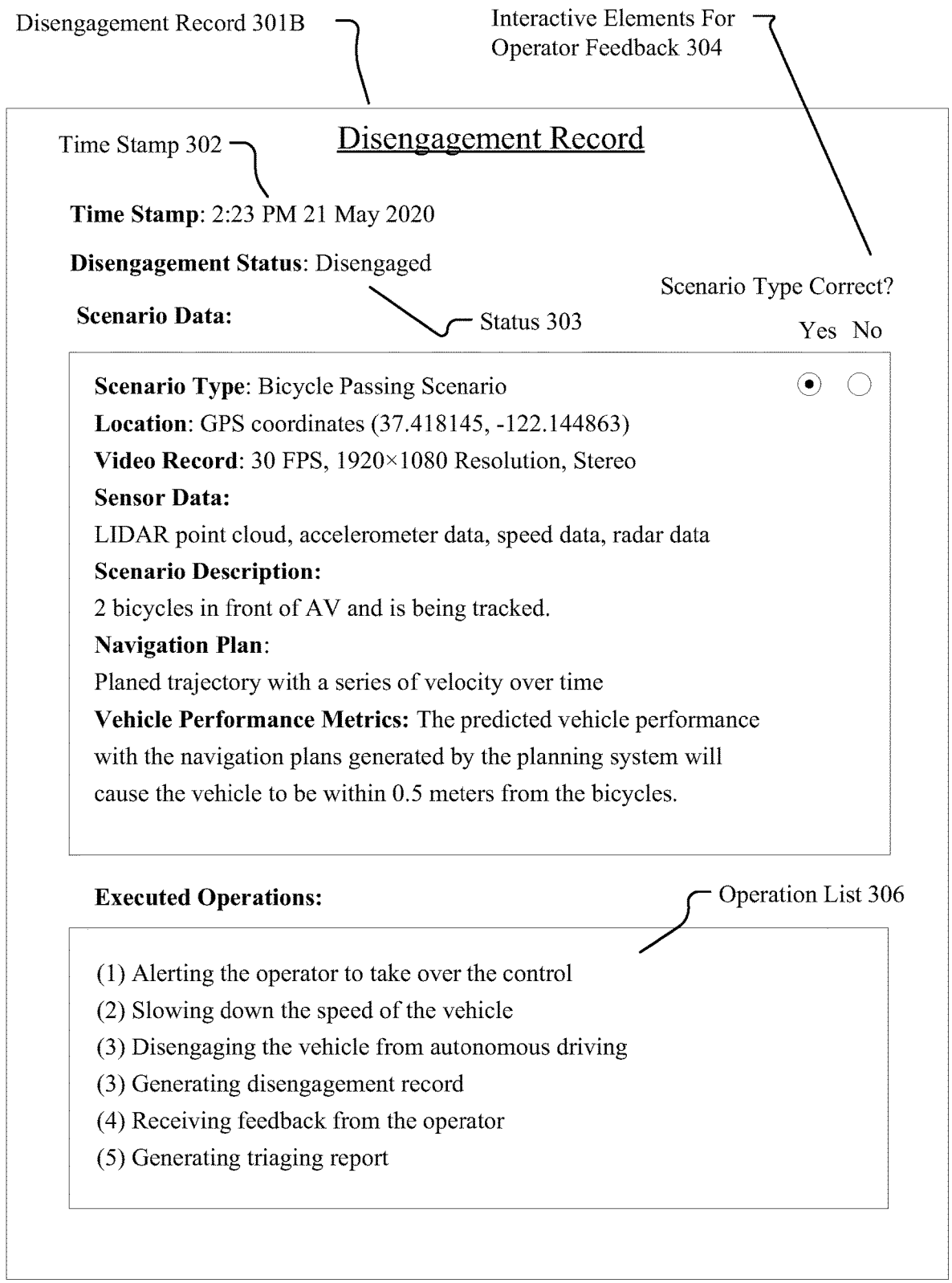
FIG. 3B illustrates an example disengagement record generated based on the record template in FIG. 3A.

FIG. 3B illustrates an example disengagement record 301B generated based on the record template in FIG. 3A. In particular embodiments, to generate the disengagement record, the system may fetch a variety of types of data associated with the current scenario including, for example, but not limited to, a time, a date, a disengagement status, GPS coordinates, camera frame rates, camera resolutions, number of bicycles, a smallest distance between the vehicle and bicycles, executed disengagement operations, vehicle control operations, a planned trajectory, a series of vehicle velocities with corresponding moving directions, etc. The system may generate a disengagement record 301B by automatically filling the blank spaces in the record template 301A and replacing the place holders in the record template 301A with actual numbers based on the fetched data. For example, to generate the disengagement record 301B, the system may replace the place holders in the time stamp 302 with the actual time (e.g., 2:23 PM 21 May 2020), fill in the disengagement status 303 (e.g., "Disengaged"), replace the place holders in the GPS coordinate with actual coordinate numbers (e.g., 37.418145, −122.144863), replace the place holders for camera frame rate (e.g., 30 FPS) and resolution (e.g., 1920×1080), replace the place holder for the number of bicycles (e.g., 2 bicycles), and replace the place holder for the distance from vehicle to bicycles with the actual number (e.g., 0.5 meters), etc.

In particular embodiments, the system may include the operations that are actually executed by the vehicle in the disengagement record (e.g., in the section of "Executed Operations"). The system may include or exclude one or more disengagement operations based on the operations that are actually executed by the vehicle. For example, the system may include "full stopping the vehicle" if the vehicle was fully stopped by the automatically triggered disengagement operation and may exclude this particular operation if the vehicle was not fully stopped. In particular embodiments, the system may convert the fetched data and information associated with the current scenario into text in natural language. Then, the system may use one or more natural language processing (NLP) algorithms to process the text in natural language to generate additional content for describing the associated scenario in the disengagement record. For example, the system may add additional description for the video record (e.g., stereo video). As another example, the system may further clarify one or more information elements in the scenario description, or the vehicle performance metric based on the processing result of NLP algorithms.

In particular embodiments, the system may allow the human operator to provide feedback information to the automatically generated disengagement record. For example, the system may receive the human operator's feedback using the interactive elements 304. The human operator may confirm or disconfirm the scenario type or category as determined by the scenario classification module. When the operator disconfirms the scenario type or category, the system may allow the operator to input or select a correct scenario category. The system may access from a database a new template for the correct scenario category selected by the operator and re-generate the disengagement record based on the new template. As another example, the system may allow the operator to edit (e.g., adding, deleting, or modifying) any sections or any contents in the automatically generated record 301B. In particular embodiments, after receiving feedback from the operator, the system may finalize the disengagement record and store the record into a database in a local computer storage or a remote server computer (e.g., submitting or uploading to the server). In particular embodiments, the system may fetch and include in the disengagement record the perception data associated with scenario, the vehicle performance evaluation data, the navigation plan, and the actual vehicle operation data after being disengaged (as controlled by the human operator or the automatic co-pilot), etc. The system may use the scenario-specific data to update (e.g., re-train) the classification algorithms for classifying future scenarios more accurately and precisely. The system may use the vehicle operation data (as controlled by the human operator or the automatic co-pilot) to train the planning system to generate navigation plans for the associated scenario.

In particular embodiments, the system may automatically triage the disengagement records that are finalized based on the feedback information of the human operator. For each disengagement record, the system may automatically dispatch that record to a corresponding team and generate a triage record based on analysis on information included in the record. For example, the disengagement record may include text labels, numbers, and text description in natural language formats, status indicator (e.g., correct or incorrect as confirmed by the human operator), etc. In particular embodiments, the system may use a natural language processing (NLP) algorithm (e.g., text classification algorithms, text recognition algorithms) to analyze the text content of each disengagement record for automatically triaging that disengagement record. In particular embodiments, the system may use a computer vision algorithm (e.g., image classification algorithms) to analyze the image content (e.g., images of the video record) of each disengagement record for automatically triaging that disengagement record.

As an example and not by way of limitation, the system may triage a disengagement record based on the root cause(s) of the triggered disengagement operation (e.g., disengagement triggered by unknown scenarios, disengagement triggered by scenarios that are not included in the operational design domain, or disengagement triggered by a vehicle performance below a pre-determined threshold). The system may assign the disengagement records of the same root cause(s) to a same team. As another example and not by way of limitation, the system may triage a disengagement record based on the associated scenario category. The system may assign the disengagement records that are associated with one or more particular scenario categories to a corresponding team (e.g., assigning disengagement records of unprotected right turn to a first team, assigning disengagement records of bicycle-passing scenarios to a second team). In particular embodiments, the system may triage disengagement records based on an automatic triaging process and information received during an interaction with human operator. For example, the system may automatically triage the disengagement records based on one or more pre-determined criteria. Then, the system may receive feedback information from the human operator during an interaction process with the human operator. The feedback information received from the human operator may include information that confirms, disconfirms, or changes the triage result by the automatic triaging process. The disengagement records may be marked by the system as "triaged" after they are triaged by the automatic triage process with or without feedback information from the human operator.

Figure 4A:
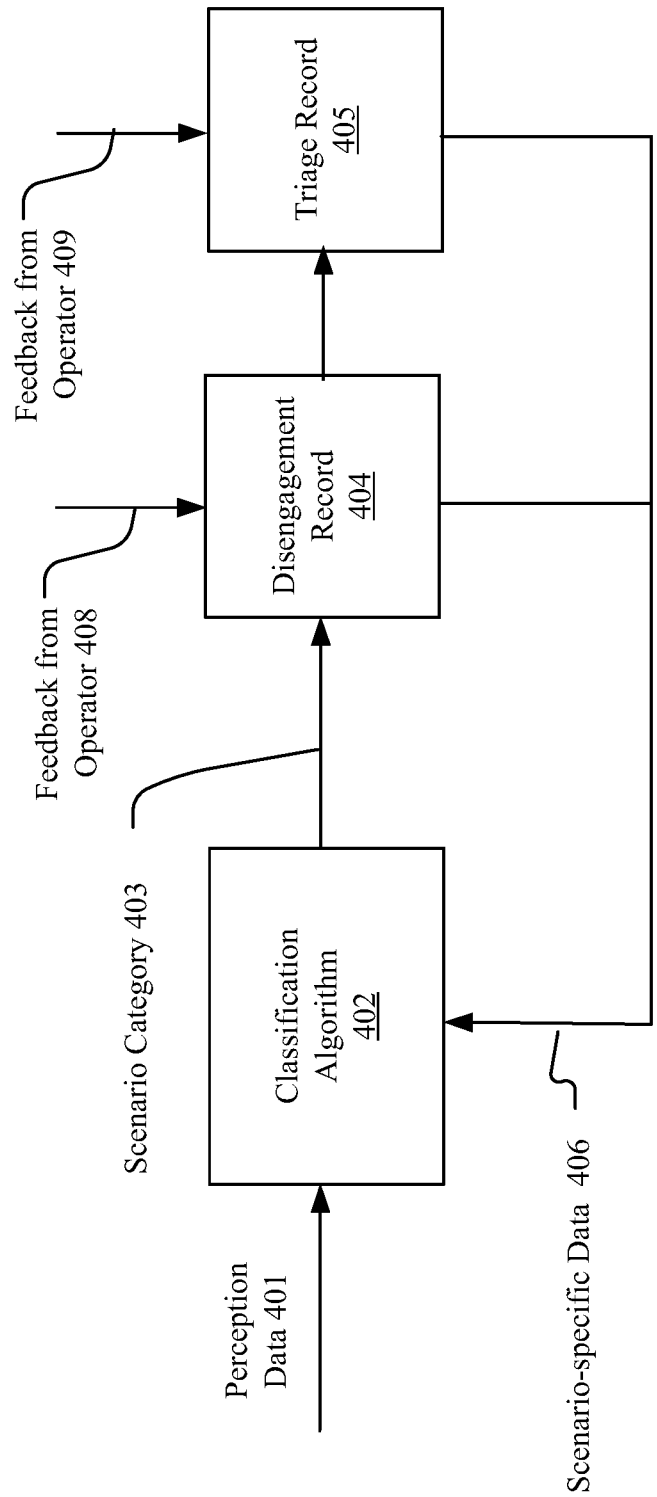
FIG. 4A illustrates an example framework for updating scenario classification algorithms based on scenario-specific data.

FIG. 4A illustrates an example framework 400A for updating scenario classification algorithms based on scenario-specific data. In particular embodiments, the system may modify the scenario classification algorithms, which are used for identifying and classifying scenarios encountered by the vehicle while driving in an autonomous driving mode, based on the scenario-specific data extracted from the disengagement records and triage records. As an example and not by way of limitation, the system may use the classification algorithm 402 (e.g., a rule-based classification algorithm or a ML model) to identify a scenario encountered by the vehicle based on the perception data 401 associated with the surrounding environment. The system may use the classification algorithm 401 to classify the identified scenario into a corresponding scenario category 403. For example, the system may compare the identified scenario to a number of scenario models stored in a data and determine a probability score for the identified scenario to belong to each scenario category of these scenario models. The system may classify the identified scenario into a scenario category being associated with the highest probability score.

The system may include the scenario category label of the identified scenario category in the disengagement record and triage record together with other scenario-specific data associated the identified scenario. In particular embodiments, the system may allow human operators to provide feedback information (e.g., 408 and 409) by reviewing and editing the disengagement record 404 and triage record 405. The feedback information received from the human operators may include information confirming that the scenario category of the identified scenario is correct. The scenario classification results that are confirmed by the human operator to be correct may be used as positive samples to update the classification algorithms. The feedback information received from the human operators may include information indicating that the scenario category of the identified scenario is incorrect. In this case, the system may allow the human operators to input or select a correct scenario category. The scenario classification results that are indicated by the human operators to be incorrect may be used as negative samples to update the classification algorithms. The system may update the classification algorithm 402 based on the scenario-specific data 406 fed back to the system. The scenario-specific data 406 may include positive and negative classification samples, scenario-specific perception data, and data related to new scenarios identified based on the operator feedback on previously unknown scenarios.

In particular embodiments, the classification algorithm 402 may be a rule-based classification algorithm used for classifying scenarios encountered by the vehicle. The system may update the rule-based classification algorithm based on the scenario-specific data 406 which is fed back to the system. As an example and not by way of limitation, the system may update one or more rules of a rule-based classification algorithm based on the positive and negative samples of the former classification results. The rule-based classification algorithm with the updated rules may correctly classify future scenarios that are the same or similar to the scenarios of these negative/positive samples into correct scenario categories. As an example and not by way of limitation, the system may add one or more rules to the rule-based classification algorithm based on the positive and negative samples of the former classification results. The rule-based classification algorithm with the new rules may correctly classify future scenarios that are the same or similar to the scenarios of these negative/positive samples into correct scenario categories. As an example and not by way of limitation, the system may add one or more rules to the rule-based classification algorithm based on one or more new scenarios that are previously unknown to the system. The system may create a new scenario category each time the vehicle encounters an unknown scenario. The system may use information received from human operators to identify or define the scenario category for this previously unknown scenario and generate one or more new rules for the classification algorithm based on the new scenario. The rule-based classification algorithm with the new rules may correctly classify future scenarios that are the same or similar to the new scenario.

In particular embodiments, the classification algorithm 402 may be a machine-learning (ML) model used for classifying scenarios encountered by the vehicle. The system may update the ML model based on the scenario-specific data 406 that is fed back to the system. As an example and not by way of limitation, the system may re-train the ML model used for classifying scenarios using the positive and negative samples of the former classification results. The ML model, once re-trained with these positive and negative samples may correctly classify future scenarios that are the same or similar to the scenarios of these negative/positive samples into correct scenario categories. As another example and not by way of limitation, the system may re-train the ML model using scenario-specific data associated with one more new scenarios that are previously unknown scenarios and are categorized based on feedback information from human operators. The ML model, once re-trained with the scenario-specific data associated with these new scenarios may correctly classify future scenarios that are the same or similar to these new scenarios into correct scenario categories. The system may continuously or periodically feed the scenario-specific data to re-train the classification algorithms to allow the system to learn how to handle more and more scenarios, and eventually allow the classification algorithms to classify most or all of possible scenarios that could possibly be encountered by the vehicle.

Figure 4B:
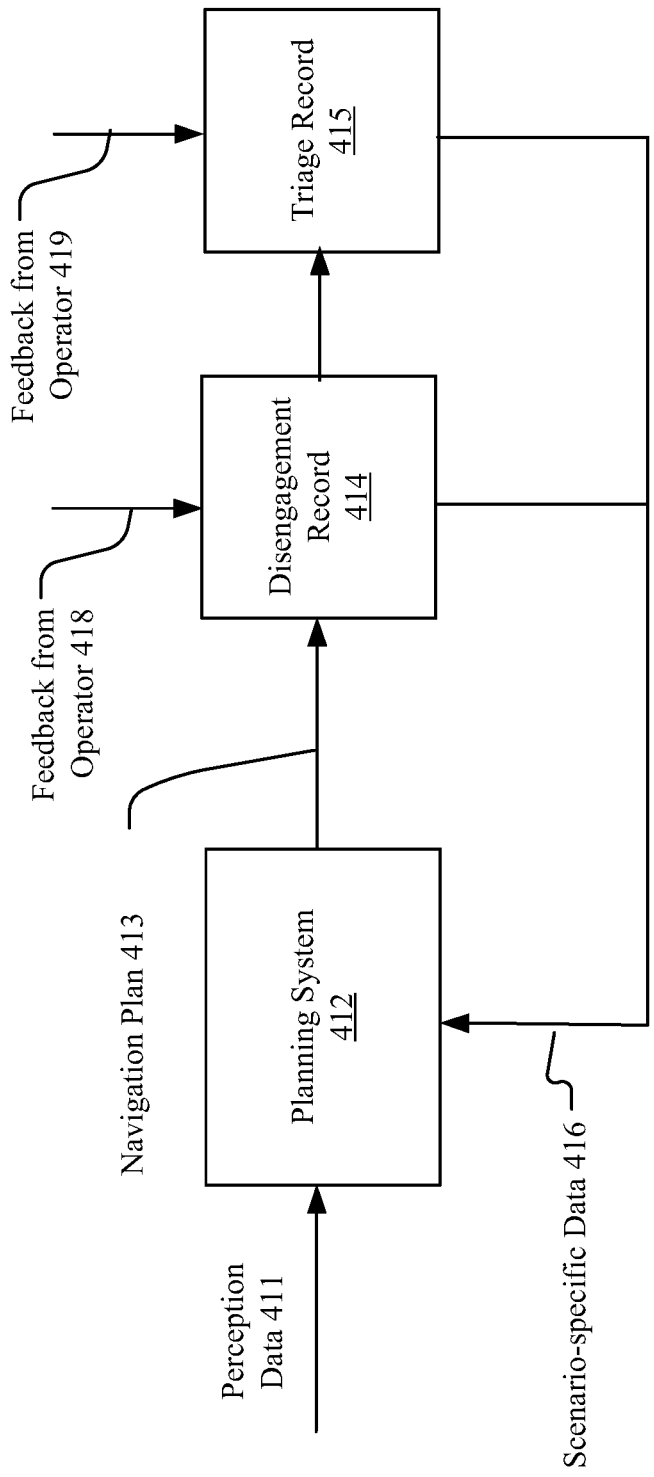
FIG. 4B illustrates an example framework for re-training the planning system based on scenario-specific data.

FIG. 4B illustrates an example framework 400B for re-training the planning system based on scenario-specific data. In particular embodiments, the planning system may generate a navigation plan 413 based on the perception data 411 for the current scenario. When the vehicle performance under the navigation plan 413 fails to meet one or more pre-determined criteria, the system may trigger the disengagement operation (e.g., alerting the human operator to take over, slowing down the vehicle), and generate the disengagement record 414 and the triage 415 record. The system may allow the human operator to provide feedback (e.g., 418 and 419) by reviewing and editing the disengagement record 414 and triage record 415. In particular embodiments, the disengagement record 414 and triage record 415 may include scenario-specific data including, for example, but not limited to, perception data, vehicle performance data (e.g., the planned trajectory, the minimum distance, vehicle performance evaluation data, etc.), the actual vehicle operation data as controlled by the human operator or auto co-pilot, etc. The system may feed the scenario-specific data 416 to the planning system 412 to allow the planning system to learn how to generate navigation plans that could safely navigate the vehicle under the corresponding scenarios. The system may re-train the planning system to generate navigation plans that could provide vehicle performance that meets the pre-determined performance criteria.

As an example and not by way of limitation, the system may feed scenario-specific data (including actual vehicle operation data as controlled by human operators or auto-copilot) associated with a scenario that is previously excluded from the operational design domain of the vehicle. The planning system, once retrained, may be capable of generating navigation plans for future scenarios that are the same or similar to this previously unsupported scenario. The system may add this scenario to the operational design domain. As an example and not by way of limitation, the system may feed scenario-specific data (including actual vehicle operation data as controlled by human operators or auto-copilot) associated with a new scenario that is previously unknown to the system and is categorized based on feedback information from the operator. The planning system, once retrained, may be capable of generating navigation plans for future scenarios that are the same or similar to this previously unknown scenario. The system may add this scenario to the operational design domain of the vehicle. The system may continuously or periodically feed the scenario-specific data to the planning system to allow the planning system to learn to handle more and more scenarios, and eventually allow the vehicle to handle most or all of possible scenarios that could possibly be encountered by the vehicle.

Figure 5:
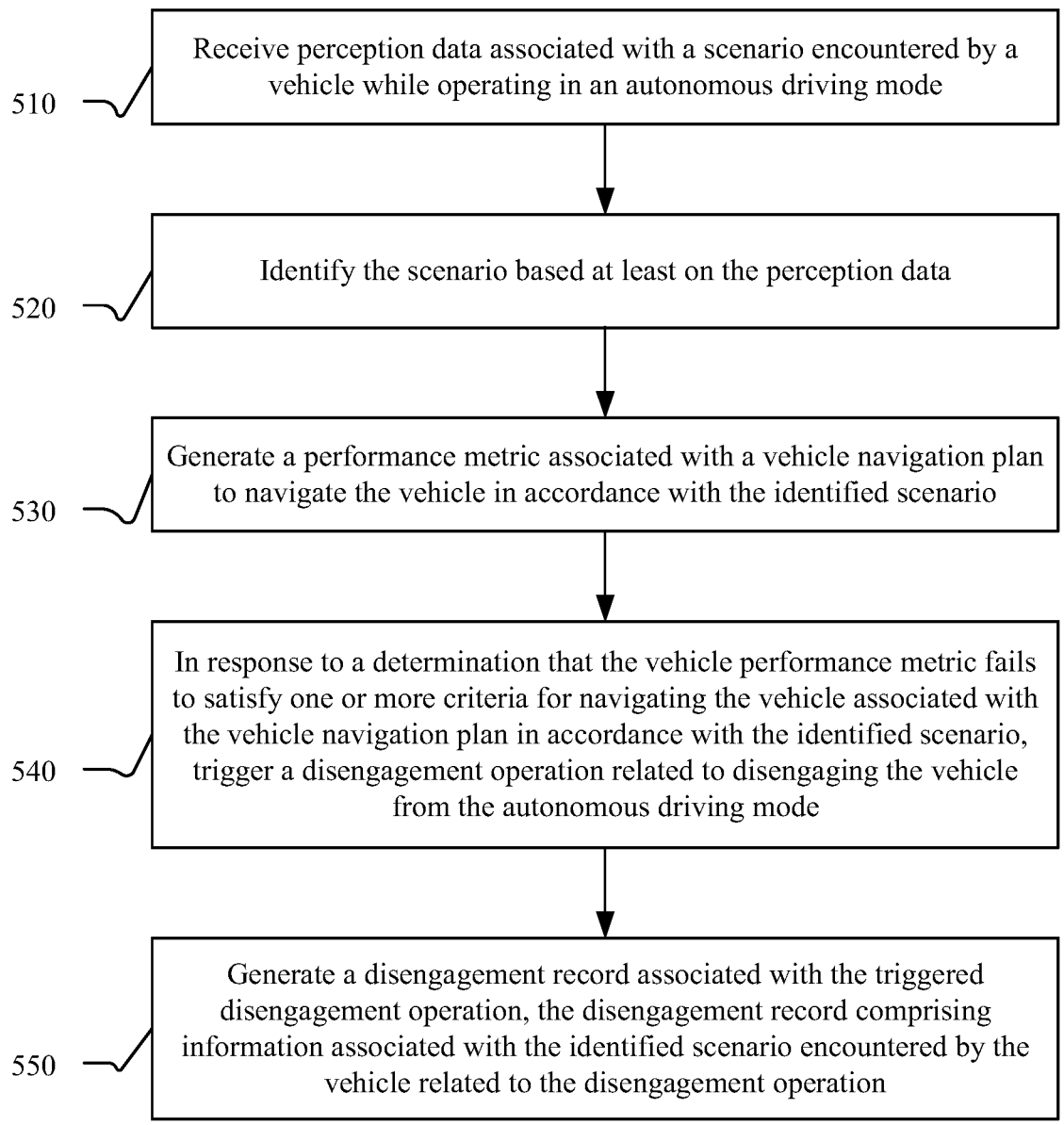
FIG. 5 illustrates an example method for automatically triggering a disengagement operation based on a scenario encountered by the vehicle.

FIG. 5 illustrates an example method 500 for automatically triggering a disengagement operation based on a scenario encountered by the vehicle. In particular embodiments, the method may begin at step 510, where a computing system associated with an autonomous vehicle may receive perception data associated with a scenario encountered by a vehicle while operating in an autonomous driving mode. At step 520, the system may identify the scenario based at least on the perception data. At step 530, the system may generate a performance metric associated with a vehicle navigation plan to navigate the vehicle in accordance with the identified scenario. At step 540, in response to a determination that the performance metric associated with the vehicle navigation plan fails to satisfy one or more criteria for navigating the vehicle in accordance with the identified scenario, the system may trigger a disengagement operation related to disengaging the vehicle from the autonomous driving mode. At step 550, the system may generate a disengagement record associated with the triggered disengagement operation. The disengagement record may include information associated with the identified scenario encountered by the vehicle related to the disengagement operation.

In particular embodiments, the disengagement operation may include sending an alert message to an operator that the vehicle is going be disengaged from the autonomous driving mode, slowing down a speed of the vehicle, or automatically disengaging the vehicle from the autonomous driving mode. In particular embodiments, prior to the determination that the performance metric fails to satisfy the one or more criteria, the system may receive additional perception data associated with an additional scenario encountered by the vehicle. The system may determine, based on the additional perception data, that the additional scenario cannot by identified. The system may, in response to determining that the scenario cannot be identified, trigger the vehicle to disengage from the autonomous driving mode. In particular embodiments, the system may update a database corresponding to an operational design domain of the vehicle to include the unidentifiable scenario. The system may receive feedback associated with the unidentifiable scenario and use the feedback to identify the unidentifiable scenario. In particular embodiment, the scenario may be identified based at least on determining whether the perception data associated with the scenario corresponds to data associated with one or more previously identified scenarios that are defined by an operational design domain of the vehicle.

In particular embodiments, prior to identifying the scenario based at least on the perception data, the system may identify a known scenario based on further perception data received by the vehicle based on new perception data of the vehicle. The identified known scenario may be excluded from the pre-determined scenarios corresponding to the operational design domain. The system may automatically disengage the vehicle from the autonomous driving mode in according with the identified known scenario being excluded from the plurality of pre-determined scenarios and automatically generate a new disengagement record based on the identified known scenario of the vehicle. In particular embodiments, the disengagement record may be automatically generated to include a pre-filled template including the identified scenario. In particular embodiments, the system may receive feedback information associated with the pre-filled template. The system may determine, based on the feedback information, that the identified scenario included in the pre-filled template is incorrect. The system may replace, in the pre-filled template, the identified scenario with another scenario. In particular embodiments, the system may provide an updated model based on scenario information of the disengagement record and the feedback information to improve a classification accuracy of the machine-learning model. In particular embodiments, the one or more criteria for evaluating the performance metric may include one or more of, for example, but not limited to, a distance between the vehicle and another agent or object being greater than or equal to a pre-determined threshold distance, a moving speed being within a pre-determined speed range, an acceleration or deceleration being within a pre-determined acceleration range, a turning radius being with a pre-determined radius range, or a relative speed with respect to a nearby object being within a pre-determined relative speed range. In particular embodiments, the system may determine a probability score for each of a number of pre-determined scenarios with respect to each of the scenario categories. The probability score may indicate a probability level of an associated scenario belonging to an associated scenario category. A number of scenarios encountered by the vehicle may be classified into respective scenario categories based on the associated probability scores.

In particular embodiments, the system may capture vehicle operation data after the vehicle is disengaged from the autonomous driving mode. The system may include the captured vehicle operation data in the disengagement record associated with the identified scenario. The captured vehicle operation data may include at last one of a vehicle acceleration, a vehicle velocity, or a vehicle trajectory. In particular embodiments, the system may determine an importance score for each scenario of a number of scenarios concurrently encountered by the vehicle. The importance score may be based on a severeness level associated with each scenario. The identified scenario may be associated with a highest importance score among the scenarios. The system may select the identified scenario from a number of scenarios concurrently encountered by the vehicle in response to a determination that the identified scenario is associated with a highest importance score among the scenarios concurrently encountered by the vehicle.

In particular embodiments, the system may generate an image raster for an image associated with the identified scenario. The system may categorize a disengagement event associated with the disengagement operation based on an analysis on pixels of the image raster. The disengagement record may be generated based on the categorized disengagement event. In particular embodiments, the disengagement record may include a text content describing the identified scenario. The system may analyze the text content of the disengagement record using a text recognition algorithm. The system may assign, based on the analysis result of the text recognition algorithm, the disengagement record to a particular team for triaging the identified scenario related to the disengagement operations included in the disengagement record. In particular embodiments, the disengagement record may include an image associated with the identified scenario. The system may analyze the image of the disengagement record using an image classification algorithm. The system may assign, based on the analysis result of the image classification algorithm, the disengagement record to the particular team for triaging the disengagement record.

In particular embodiments, the system may, in response to a first new scenario being an un-identifiable scenario, automatically disengage the vehicle from the autonomous driving mode. The system may generate a new disengagement record including perception data associated with the un-identifiable scenario. The system may associate the perception data included in the new disengagement record to an identifiable scenario based on an operator feedback. In particular embodiments, in response to a second new scenario being the identifiable scenario, the system may navigate the vehicle in the autonomous driving mode in accordance with a navigation plan generated by the vehicle. In particular embodiments, the vehicle navigation plan may include a planned trajectory for navigating the vehicle under the current scenario. The planned trajectory may include a series of vehicle locations over time. Each of the series of vehicle locations may be associated with a vehicle velocity and a moving direction. In particular embodiments, the system may determine a confidence level associated with the current scenario based on a matching metric between the current scenario and the pre-determined scenario, a severe level of the pre-determined scenario, or an occurring frequency of the pre-determined scenario. The disengagement operation may be triggered based on the confidence level associated with the current scenario. In particular embodiments, the system may extract scenario information and vehicle performance information from a number of disengagement records associated with a number of scenarios. The system may train the navigation planning system based on the extracted scenario information and vehicle performance information. The navigation planning system, once trained, may generate vehicle navigation plans that allow the vehicle to have a performance metric meeting one or more pre-determined criteria (e.g., being above a performance threshold) under these scenarios.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for automatically triggering a disengagement operation based on a scenario encountered by the vehicle including the particular steps of the method of FIG. 5, this disclosure contemplates any suitable method for automatically triggering a disengagement operation based on a scenario encountered by the vehicle including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
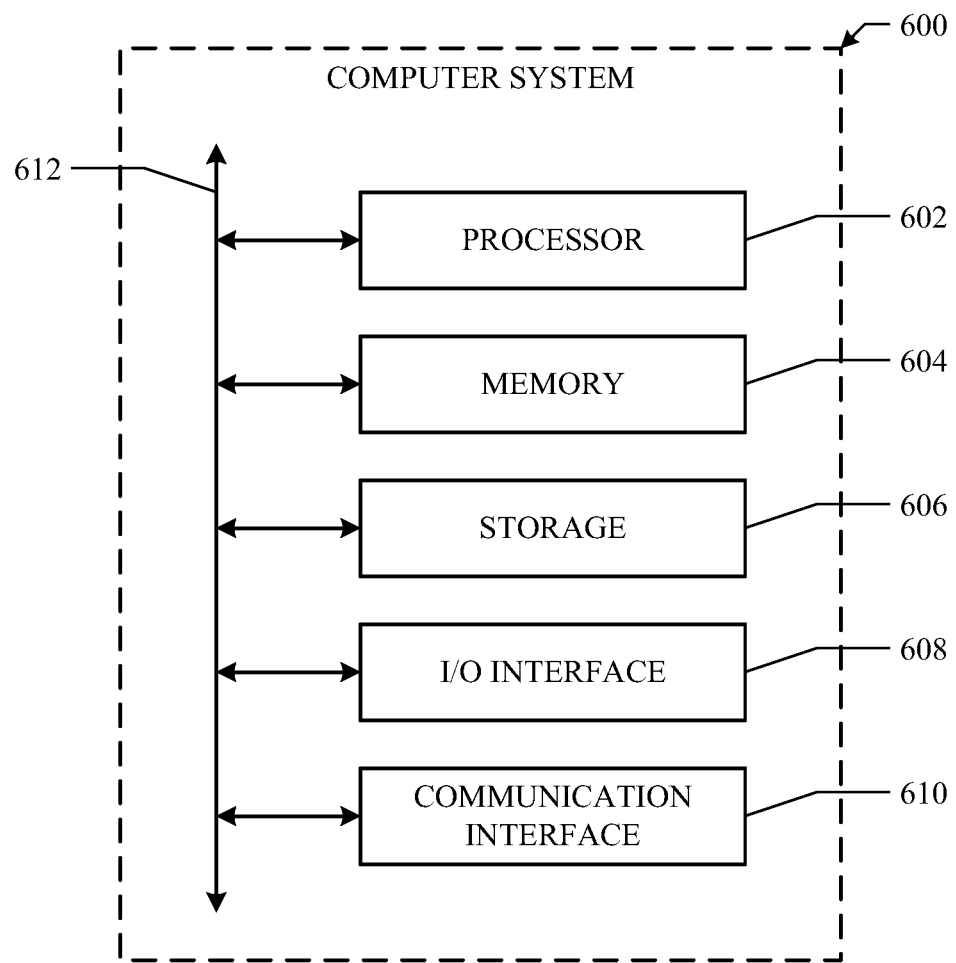
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a remote server computer, which may include one or more remote server computing components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth™ WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving perception data associated with a perceived scenario encountered by a vehicle while operating in an autonomous driving mode;
   identifying the perceived scenario based at least on the perception data;
   generating a performance metric associated with a vehicle navigation plan to navigate the vehicle in accordance with the perceived scenario, the performance metric indicating a predicted ability of the vehicle to navigate the perceived scenario along a planned trajectory, the perceived scenario representing different arrangements of elements including i) a known configuration of identified objects that is not supported by a planning system and ii) an arrangement of unidentifiable objects;
   in response to a determination that the performance metric associated with the vehicle navigation plan fails to satisfy one or more criteria for navigating the vehicle in accordance with the perceived scenario, triggering a disengagement operation related to disengaging the vehicle from the autonomous driving mode; and
   generating a disengagement record associated with the disengagement operation, the disengagement record comprising information associated with the perceived scenario encountered by the vehicle related to the disengagement operation.

2. The method of claim 1, wherein the disengagement operation comprises performing at least one of:
   sending an alert message to an operator that the vehicle is going to disengage from the autonomous driving mode;
   slowing down a speed of the vehicle; and
   automatically disengaging the vehicle from the autonomous driving mode.

3. The method of claim 1, wherein, prior to the determination that the performance metric fails to satisfy the one or more criteria, the method further comprises:
   receiving additional perception data associated with the perceived scenario encountered by the vehicle;
   based on the additional perception data, determining that the perceived scenario cannot be identified; and
   in response to determining that the perceived scenario cannot be identified, triggering the vehicle to disengage from the autonomous driving mode.

4. The method of claim 3, further comprising;
updating a database corresponding to an operational design domain of the vehicle to include the perceived scenario that is unidentifiable;
receiving feedback associated with the perceived scenario; and
using the feedback to identify the perceived scenario.

5. The method of claim 1, wherein the perceived scenario is identified based at least on determining whether the perception data associated with the perceived scenario corresponds to data associated with one or more previously identified scenarios that are defined by an operational design domain of the vehicle.

6. The method of claim 5, wherein, prior to identifying the perceived scenario based at least on the perception data, the method further comprises:
identifying a known scenario based on further perception data received by the vehicle, wherein the known scenario is excluded from a plurality of pre-determined scenarios corresponding to the operational design domain;
automatically disengaging the vehicle from the autonomous driving mode in accordance with the known scenario being excluded from the plurality of pre-determined scenarios; and
automatically generating a new disengagement record based on the known scenario of the vehicle.

7. The method of claim 1, wherein the disengagement record is automatically generated to include a pre-filled template, and wherein the pre-filled template includes the perceived scenario.

8. The method of claim 7, further comprising:
receiving feedback information associated with the pre-filled template;
determining, based on the feedback information, that the perceived scenario included in the pre-filled template is incorrect; and
replacing, in the pre-filled template, the perceived scenario with another scenario.

9. The method of claim 1, wherein the one or more criteria comprise one or more of:
a distance between the vehicle and another agent or object being greater than or equal to a pre-determined threshold distance;
a moving speed being within a pre-determined speed range;
an acceleration or deceleration being within a pre-determined acceleration range;
a turning radius being within a pre-determined radius range; or
a relative speed with respect to a nearby object being within a pre-determined relative speed range.

10. The method of claim 1, further comprising:
determining a probability score for each of a plurality of pre-determined scenarios with respect to each of a plurality of scenario categories, wherein the probability score indicates a probability level of that scenario belonging to an associated scenario category, and wherein the plurality of pre-determined scenarios are classified into the plurality of scenario categories based on associated probability scores.

11. The method of claim 1, further comprising:
capturing vehicle operation data after the vehicle is disengaged from the autonomous driving mode; and
including the vehicle operation data in the disengagement record associated with the perceived scenario, wherein the vehicle operation data includes at least one of a vehicle acceleration, a vehicle velocity, or a vehicle trajectory.

12. The method of claim 1, further comprising:
determining an importance score for each scenario of a plurality of scenarios concurrently encountered by the vehicle, wherein the importance score is based on a severeness level associated with each scenario; and
selecting a scenario from the plurality of scenarios concurrently encountered by the vehicle in response to a determination that the scenario is associated with a highest importance score among the plurality of scenarios concurrently encountered by the vehicle.

13. The method of claim 1, further comprising:
generating an image raster for an image associated with the perceived scenario; and
categorizing a disengagement event associated with the disengagement operation based on an analysis on pixels of the image raster, wherein the disengagement record is generated based on the disengagement event.

14. The method of claim 1, wherein the disengagement record comprises a text content describing the perceived scenario, further comprising:
analyzing the text content of the disengagement record using a text recognition algorithm; and
assigning, based on an analysis result of the text recognition algorithm, the disengagement record to a particular team for triaging the perceived scenario related to the disengagement operation included in the disengagement record.

15. The method of claim 14, wherein the disengagement record comprises an image associated with the perceived scenario, further comprising:
analyzing the image of the disengagement record using an image classification algorithm; and
assigning, based on an analysis result of the image classification algorithm, the disengagement record to the particular team for triaging the disengagement record.

16. The method of claim 1, further comprising:
in response to the perceived scenario being an un-identifiable scenario, automatically disengaging the vehicle from the autonomous driving mode;
generating a new disengagement record including the perception data associated with the un-identifiable scenario; and
associating the perception data included in the new disengagement record to an identifiable scenario based on an operator feedback.

17. The method of claim 16, further comprising:
in response to a subsequent scenario being the identifiable scenario, navigating the vehicle in the autonomous driving mode in accordance with a navigation plan generated by the vehicle.

18. The method of claim 1, further comprising:
extracting scenario information and vehicle performance information from a plurality of disengagement records associated with a plurality of scenarios; and
training the planning system based on the scenario information and vehicle performance information, wherein the planning system, once trained, generates vehicle navigation plans that allow the vehicle to have a performance metric meeting one or more pre-determined criteria under the plurality of scenarios.

19. One or more non-transitory computer-readable storage media embodying software that is operable, when executed by one or more processors of a computing system, to:

receive perception data associated with a perceived scenario encountered by a vehicle while operating in an autonomous driving mode;
identify the perceived scenario based at least on the perception data;
generate a performance metric associated with a vehicle navigation plan to navigate the vehicle in accordance with the perceived scenario, the performance metric indicating a predicted ability of the vehicle to navigate the perceived scenario along a planned trajectory, the perceived scenario representing different arrangements of elements including i) a known configuration of identified objects that is not supported by a planning system and ii) an arrangement of unidentifiable objects;
in response to a determination that the performance metric associated with the vehicle navigation plan fails to satisfy one or more criteria for navigating the vehicle in accordance with the perceived scenario, trigger a disengagement operation related to disengaging the vehicle from the autonomous driving mode; and
generate a disengagement record associated with the disengagement operation, the disengagement record comprising information associated with the perceived scenario encountered by the vehicle related to the disengagement operation.

20. A system comprising:
one or more non-transitory computer-readable storage media embodying instructions; and
one or more processors coupled to the one or more non-transitory computer-readable storage media and operable to execute the instructions to:
receive perception data associated with a perceived scenario encountered by a vehicle while operating in an autonomous driving mode;
identify the perceived scenario based at least on the perception data;
generate a performance metric associated with a vehicle navigation plan to navigate the vehicle in accordance with the perceived scenario, the performance metric indicating a predicted ability of the vehicle to navigate the perceived scenario along a planned trajectory, the perceived scenario representing different arrangements of elements including i) a known configuration of identified objects that is not supported by a planning system and ii) an arrangement of unidentifiable objects;
in response to a determination that the performance metric associated with the vehicle navigation plan fails to satisfy one or more criteria for navigating the vehicle in accordance with the perceived scenario, trigger a disengagement operation related to disengaging the vehicle from the autonomous driving mode; and
generate a disengagement record associated with the disengagement operation, the disengagement record comprising information associated with the perceived scenario encountered by the vehicle related to the disengagement operation.

* * * * *